US009224159B2

(12) United States Patent
Ashbaugh

(10) Patent No.: US 9,224,159 B2
(45) Date of Patent: *Dec. 29, 2015

(54) DISTRIBUTED CONTENT EXCHANGE AND PRESENTATION SYSTEM

(71) Applicant: Douglas L. Ashbaugh, Brandon, FL (US)

(72) Inventor: Douglas L. Ashbaugh, Brandon, FL (US)

(73) Assignee: DOUGLAS ASHBAUGH, Lilburn, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/951,453

(22) Filed: Jul. 25, 2013

(65) Prior Publication Data

US 2014/0089109 A1 Mar. 27, 2014

Related U.S. Application Data

(63) Continuation of application No. 11/887,131, filed as application No. PCT/US2005/047230 on Dec. 29, (Continued)

(51) Int. Cl.
*G06Q 30/00* (2012.01)
*G06Q 30/02* (2012.01)

(Continued)

(52) U.S. Cl.
CPC .......... *G06Q 30/0277* (2013.01); *G06F 17/211* (2013.01); *G06Q 30/02* (2013.01); *G06Q 30/0248* (2013.01); *G06Q 30/0255* (2013.01)

(58) Field of Classification Search
None
See application file for complete search history.

(56) References Cited

U.S. PATENT DOCUMENTS 5,848,396 A 12/1998 Gerace
6,268,856 B1 * 7/2001 Bruck et al. ................. 715/733

(Continued)

FOREIGN PATENT DOCUMENTS

GB 2379061 A 2/2003
WO WO98/53406 11/1998

OTHER PUBLICATIONS

"Mall-hopping on the Internet". Gaffin, Adam. Network World 11.41 (Oct. 10, 1994).*

(Continued)

*Primary Examiner* — Victoria Vanderhorst
*Assistant Examiner* — Maria Vanderhorst
(74) *Attorney, Agent, or Firm* — David Lewis; Bowen Liu

(57) ABSTRACT

An Internet-oriented advertising exchange controller presents website content in a plurality of frames as well as support search criteria and other flexible forms of inventory formatting and delivery. Applications include Internet protocol request coordination or relay, cooperative frame based or interstitial advertising, and support for a local search or dataless metasearch system. The controller operates in a cookieless environment, has logic to protect advertiser's investment from AutoSurf equivalent systems, and protects against other inappropriate stimuli including denial of service or IP blast attacks.

As such, an advertiser's credits are affected only by human stimuli. Communication with and among exchange controllers for sharing or delivering information about inventory occurs by a number of protocols with optional encryption. The controller provides a foundation for a robust, advertiser protective, web based advertising and network search system with economic support by use of unstoppable framesets, and ultimately frame-based advertising and presentation methods.

24 Claims, 16 Drawing Sheets http://www.ebookgod.net/navfr.php?url=trafficcentral.com&p=658mode=v - Microsoft Internet Explor...
File Edit View Favorites Tools Help
Address http://www.ebookgod.net/navfr.php?url=trafficcentral.com&p=658mode=v Go Links >>
A TRAFFIC CENTRAL™ NETW
DEVELOPMENT COMPAN
Home Business Presentation Technical Presentation
Unstoppable Advertising
Traffic Central
By TrafficCentral LLC
Unstoppable Advertising™ is C
Business!
Powerful Marketing Technology
About Us
We sell, install and manage exchange nodes in the TrafficCentral™ Global Network
TrafficCentral.com is proud to be the marketing
NAV FRAMER™
CLICK TO VIEW
Left
Right
Click For Contests!
Warn Me Away!
Advertising by EbookGod™
Ad Network
Magic Pala
Free Download
DOWNLOAD & P
ultimatebet.com
$1M
GUA
WEEKLY
Done
Internet

Related U.S. Application Data

2005, now Pat. No. 8,930,239, which is a continuation of application No. 11/086,283, filed on Mar. 23, 2005, now Pat. No. 8,086,492.

(60) Provisional application No. 60/555,411, filed on Mar. 23, 2004, provisional application No. 60/555,412, filed on Mar. 23, 2004.

(51) Int. Cl.
*G06F 17/21* (2006.01)
*G05B 19/418* (2006.01)

(56) References Cited

U.S. PATENT DOCUMENTS 7,028,262 B2 * 4/2006 Estrada et al. ................ 715/751
7,630,986 B1 12/2009 Herz et al.
2001/0049701 A1 12/2001 Howerton, III et al.
2002/0019834 A1 * 2/2002 Vilcauskas et al. ........ 707/501.1
2002/0023094 A1 * 2/2002 Kohda et al. ............... 707/104.1
2003/0163372 A1 8/2003 Kolsy
2004/0117654 A1 6/2004 Feldman et al.
2004/0167928 A1 8/2004 Anderson et al.
2004/0181598 A1 * 9/2004 Paya et al. ..................... 709/227
2005/0216342 A1 9/2005 Ashbaugh
2006/0026180 A1 2/2006 Kres
2008/0109300 A1 * 5/2008 Bason ............................ 705/14

OTHER PUBLICATIONS

Guidelines for the graphical interface, Bertholdt, Joerg, Publisher: EE Times, Publication Date: Nov. 8, 1999, ISSN: 0192-1541 URL:http://www.eetimes.com/document.asp?doc_id=1140748.

"Building a Fast, Virtualized Data Plane with Programmable Hardware". Muhammad Bilal, et al. pp. 1-8.

* cited by examiner

DISTRIBUTED CONTENT EXCHANGE AND PRESENTATION SYSTEM

CLAIM OF PRIORITY

This application is a continuation of U.S. patent application Ser. No. 11/887,131 entitled DISTRIBUTED CONTENT EXCHANGE AND PRESENTATION SYSTEM, by Douglas Ashbaugh, filed Sep. 24, 2007; which is a national phase entry, under 35 U.S.C. 371(c), of PCT/US2005/047230, filed Dec. 29, 2005; which is a continuation-in-part of U.S. application Ser. No. 11/086,283, filed Mar. 23, 2005; which claims priority benefit of U.S. Provisional Patent Application 60/555,411, filed Mar. 23, 2004; Ser. No. 11/086,283, filed Mar. 23, 2005, also claims priority benefit of U.S. Provisional Patent Application 60/555,412, filed Mar. 23, 2004; and the contents of all of the above listed applications are incorporated herein by reference, in their entirety.

FIELD OF THE INVENTION

This specification is related to the field of coordinating and displaying information, via a network.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

For many services that deliver information to human beings, such as newspapers, magazines and broadcast television, advertising is an integral component of the business model that supports the cost of delivering the information. Similarly, advertising supports the cost of information services that are provided via the Internet. Some of the mechanisms that are employed to present advertising via the Internet include banners and pop-up windows that appear within a user's browser. Advertising service exchange technologies prevalent on the Internet often require browser-based scripting languages, browser-based cookies, or server-side cookies, which need to be enabled and available for proper ad service operation. A severe problem with prior advertising exchange art may exist if any of the scripting language, browser-side cookies, or server-side cookies, are disabled or unavailable, resulting in spurious consumption of advertisers credits or complete malfunction. The lack of availability of any of these is becoming more prevalent on the Internet due primarily to security-oriented and privacy concerns. The invention solves this set of problems by eliminating these dependencies, as well as solves other problems such as a lack of performance of prior advertising exchanges' use of blockable ad technologies.

This invention generates advertising that cannot be blocked from a practical perspective. This invention also solves the problem of limited inventory of prior stand-alone advertising exchanges by providing a communications foundation for interconnecting disparate and distinct, like, advertising exchanges. This invention provides a robust foundation and presentation platform extending normal advertising exchange capabilities with search-engine-like asynchronous query support. In addition, an advanced formatter and presentation system is provided allowing easy re-customization and configuration of search result presentation. The business model surrounding the invention is supported based on the sale and trade of impression credits for advertising and participation or interaction with the exchange controller embodied by this invention. Relative to search engine support operations, the invention eliminates the need for keyword bidding models prevalent on the Internet and extends search and content management capabilities to the point where paid-for or bidded keyword oriented paradigms are ultimately meaningless.

BRIEF DESCRIPTION OF THE DRAWINGS

In the following drawings like reference numbers are used to refer to like elements. Although the following figures depict various examples of the invention, the invention is not limited to the examples depicted in the figures.

Figure 1:
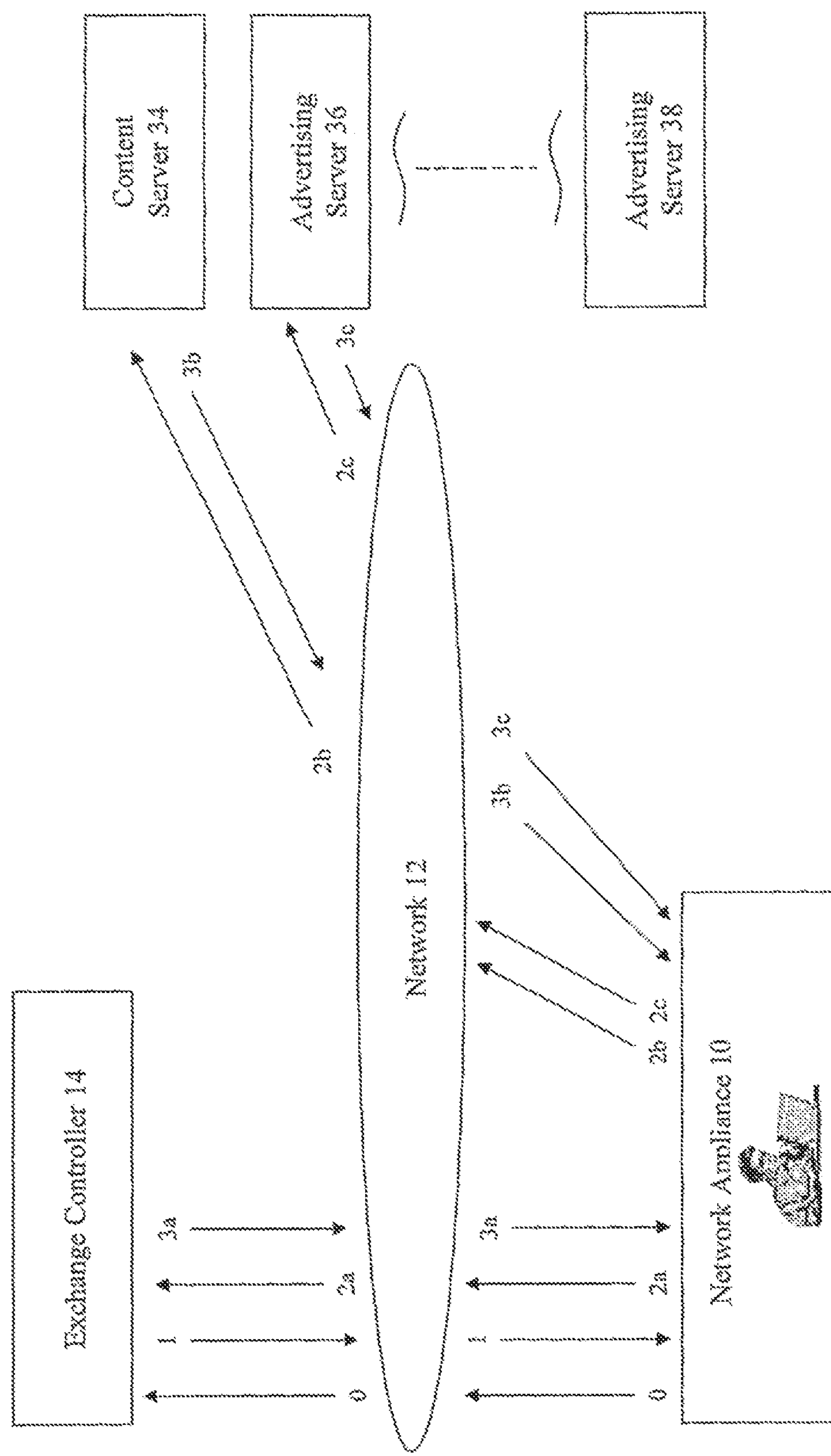
FIG. 1 is a schematic representation of a first embodiment of a network exchange for the presentation of information and related advertising in accordance with the present invention.

Notable in this diagram is also the ability for an embodiment of the present invention to relay search requests to replicated implementations of the invention for further processing.

DETAILED DESCRIPTION

Throughout this disclosure, the description text sometimes references problems or deficiencies with various Internet related technologies and related prior art as a partial basis to explain the invention herein. Although various embodiments of the invention may have been motivated by various deficiencies with the prior art, which may be discussed or alluded to in one or more place in the specification, the varied and potential embodiments of the invention may not necessarily address a specific deficiency. In other words, different embodiments of the invention may address different deficiencies that may be discussed in the specification. Some embodiments may only partially address some deficiencies or just one deficiency that may be discussed in the specification, and some embodiments may not address any of these deficiencies as each may be significant by their own merit as a unique feature or embodiment of this invention.

To facilitate an understanding of the principles upon which concepts described in this specification are based, some embodiments are described hereinafter with reference to a user viewing information provided over the Internet, by means of a browser running on a network appliance, as an example. However, the practical implementations of the invention are not limited to the example of a user viewing information over the Internet via a browser running on a network appliance. For example, the technology that presents the information to the user need not be a web browser. Rather, it can be any device that has the ability to render information that is formatted according to the Extensible Hypertext Markup Language (XHTML) standard, such as a Personal Digital Assistant (PDA), cellular telephone, or the like, in an embodiment, the underlying distributed content exchange architecture organizes and links independent content exchange systems.

Although not explicitly explained in the remainder of this specification, the systems that are linked may be independent websites on a computer, independent websites on separate computers, physically disjoint computers running a content exchange, or other form of distributed and networked hardware operating as an independent content exchange point in the overall network. The systems may support Hypertext Markup Language (HTML) compliant framesets as well, and accordingly HTML compliant framesets may be used in the examples discussed in this specification. Nonetheless, other types of framesets may be used in addition to, or instead of, HTML compliant framesets. In an embodiment, framesets are utilized as an underlying presentation method, because other methods of content presentation, particularly for the purposes of advertising, are more readily blocked by modern browser software, thus preventing display of some or all of the intended content or advertising to the target user. However, although advertising is used as an example, the framesets may be used for presenting other information that does not have any advertising content. Accordingly, the embodiments described hereinafter should be viewed as illustrative, and not limiting in any manner.

FIG. 1 is a schematic representation of a networked content exchange that can be employed to implement the principles of the present invention. The network exchange may be used to facilitate advertising or for other purposes, such as the dissemination of news or information related to public services. A user at a network appliance 10 that is running a browser application may enter a Uniform Resource Locator (URL) in the browser, or click on a link displayed in the browser, to request a web page. Network appliance 10 may be a personal computer, a terminal, PDA, a web TV, an e-book reader, a telephone, a mobile phone, or any other network appliance. As an alternative to a user action, the request for the web page can be initiated by other stimuli. For example, an embedded script or an embedded object within a page currently being viewed can automatically initiate the request for a new web page. The request is transmitted via a network 12, such as the Internet or other network, to a server 14 (e.g., an exchange controller) associated with the URL.

The transmission of the request from the network appliance 10 to the server 14, via the network 12, is represented by the arrows labeled "0." Network 12 is any group of devices that are communicatively linked to one another. For example, network 12 can be any combination of one or more of a Local Area Network (LAN), Wide Area Network (WAN), a telephone network, a wireless network, and/or other network. In the illustrated embodiment, the server includes at least one exchange controller. The exchange controller may be a combination of software and hardware in which the software is running on a machine (which is the hardware) that hosts a server (e.g., a web server). The controller may be a network hardware appliance running the content exchange software, or further encoded into a hardware-only network appliance, hi an embodiment, the controller software runs on a computer, which is a web server.

In one embodiment, the exchange system includes multiple content exchange nodes, and a controller is located at each content exchange node. The exchange system delineates different content exchange nodes by having different domain names associated with different content exchange nodes. In another embodiment, different content exchange nodes may be delineated by assigning different node IDs to each content exchange node. Alternatively, some servers may be distinguished from one another by their node IDs while other servers may be distinguished by their domain names. Using domain names, which resolve through DNS (Domain Name System) to a numeric IP (Internet Protocol) address, to identify controllers reduces the likelihood of someone duplicating the exchange system simply by eliminating the domain names and assigning a numeric network ID or networked appliance ID, because the domain is effectively the identifier that allows the distributed aspect by allowing each exchange server node to be identified. Nonetheless, in an embodiment, other identifiers maybe used to identify each individual content exchange node in the network in addition to, or instead of domain names and/or node IDs.

In response to the request from the network appliance 10, the server 14 transmits a frameset generation stream to the network appliance, as represented by the arrows "1." This frameset generation stream comprises XHTML code that causes the browser to display a window having one or more frames. An XHTML content rendering and layout construct, such as a frameset tag, with any number of subordinate frame tags, defines the layout of a browsing device window, or portion of the overall window, that allows multiple views of full XML, XHTML, or HTML documents to be concurrently presented in such a manner that the information in one view remains visible while other views are scrollable or replaceable as though they are operating in their own fully functional browser window. Further, an attribute of the frame tag is an Internet URL that indicates to a web browser where to derive content for rendering in the related frame.

Figure 2:
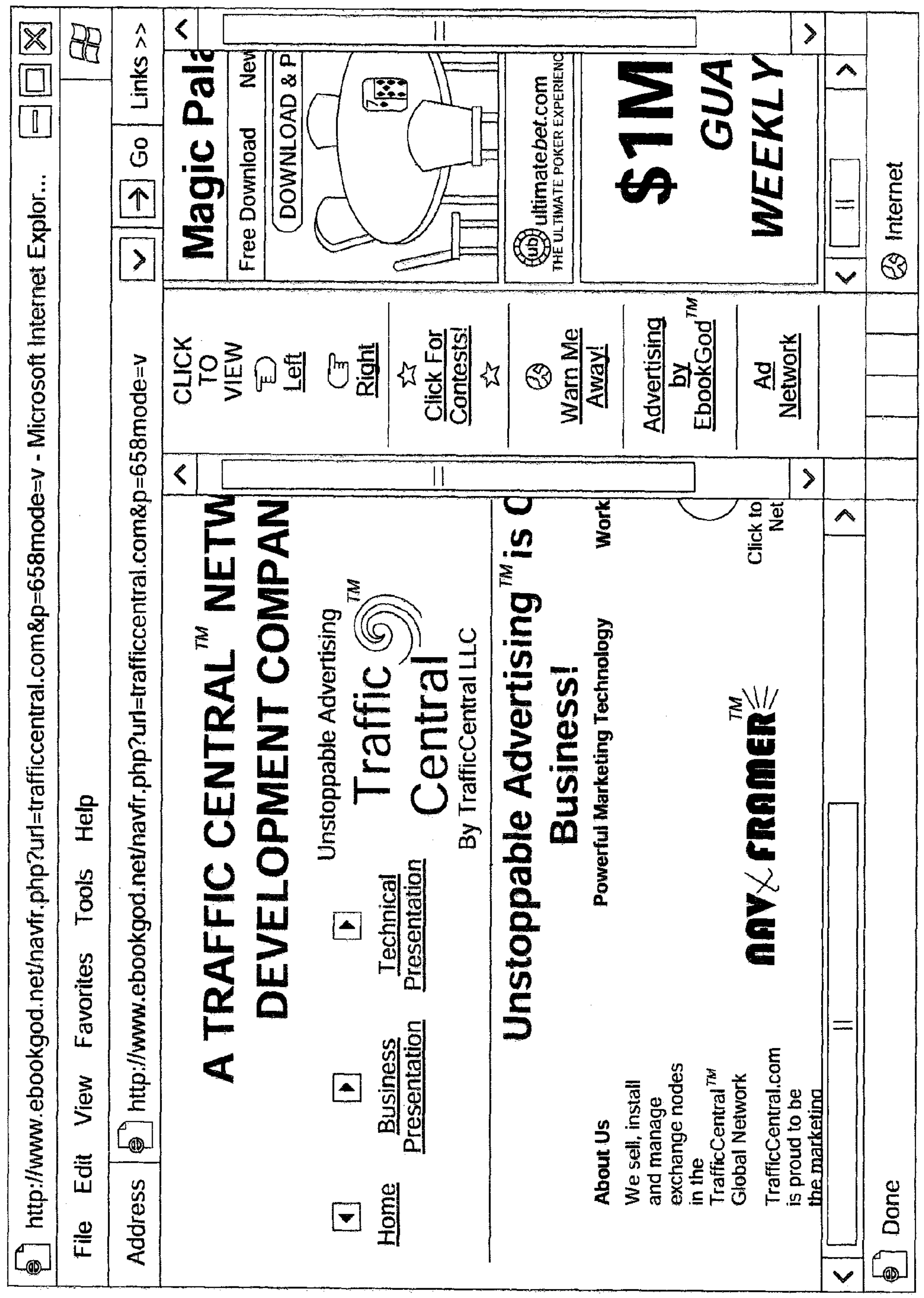
FIGS. 2, 2*a*, and 2*b* are illustrations of browser windows that are divided into frames to present content, navigation features, and advertising within the frames, in accordance with one implementation of the present invention.
Figure 2A:
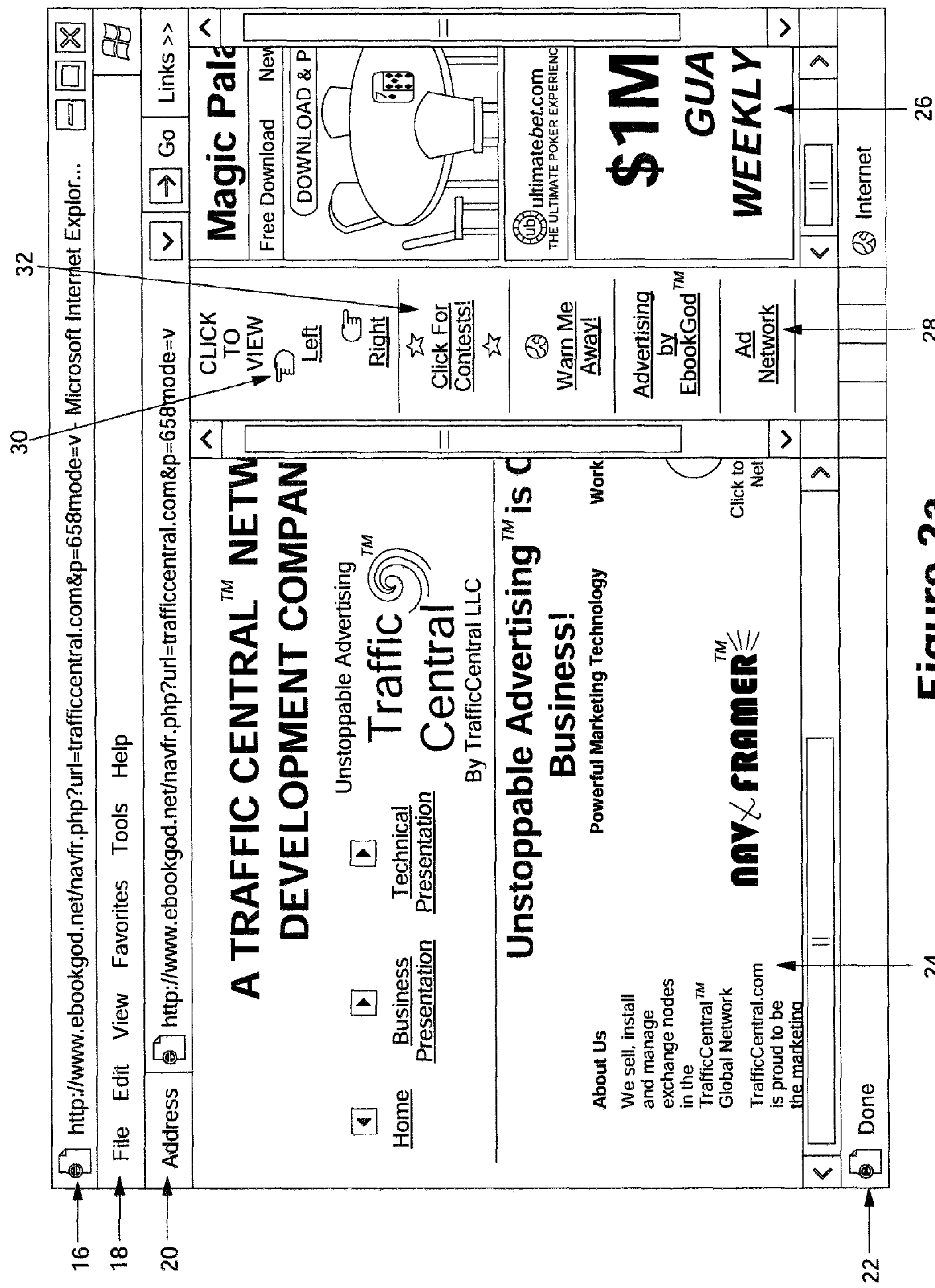

Combined, the frameset tag, frame tags, and related internal Internet URLs are referred to herein as the frameset generation stream. The frameset generation stream 1 indicates the structure of the frames within the display area of the browser window or equivalent device, and identifies the content that is to fill each of the frames. Examples of an XML document with XHTML Document Type Definition (DTD) translation support for frameset generation streams are presented below. In the first example, the display area of a window is split vertically, to present frames that are arrayed across the width of the display area, as shown in FIGS. 2 and 2*a*.

```
<! DOCTYPE XML PUBLIC “5//W3C//DTD XHTML 1.0//EN”
“prot://www.w3.org/TR/xhtml/DTD/frameset.dtd”>
<HTML xmms=“ρrot://www.w3.org/1999/xhtml”>
<B0DY>
FRAMESET COLS=“50%, 85,*“ FRAMEBORDER=“YES”
BORDER=11O” FRAMESPACING=11O” ROWS=“ 1 ”>
<FRAME NAME=“leftFramel 111070204” SCROLLING=11YES”
noresize SRC=“prot://siteA.com” />
<FRAME NAME=“navFramel 111070204” SCROLLING=11NO11
noresize SRC=“prot://www.Sitel4.net/popsitenavscrn2.php?website=
prot://www.siteB.info&original=prot://siteA.com” />
<FRAME NAME=“rightFramel 111070204” SCROLLING=“YES”
noresize SRC=“ρrot://www.siteB.info” />
</FRAMESET>
</BODY>
</HTML>
```

Figure 2B:
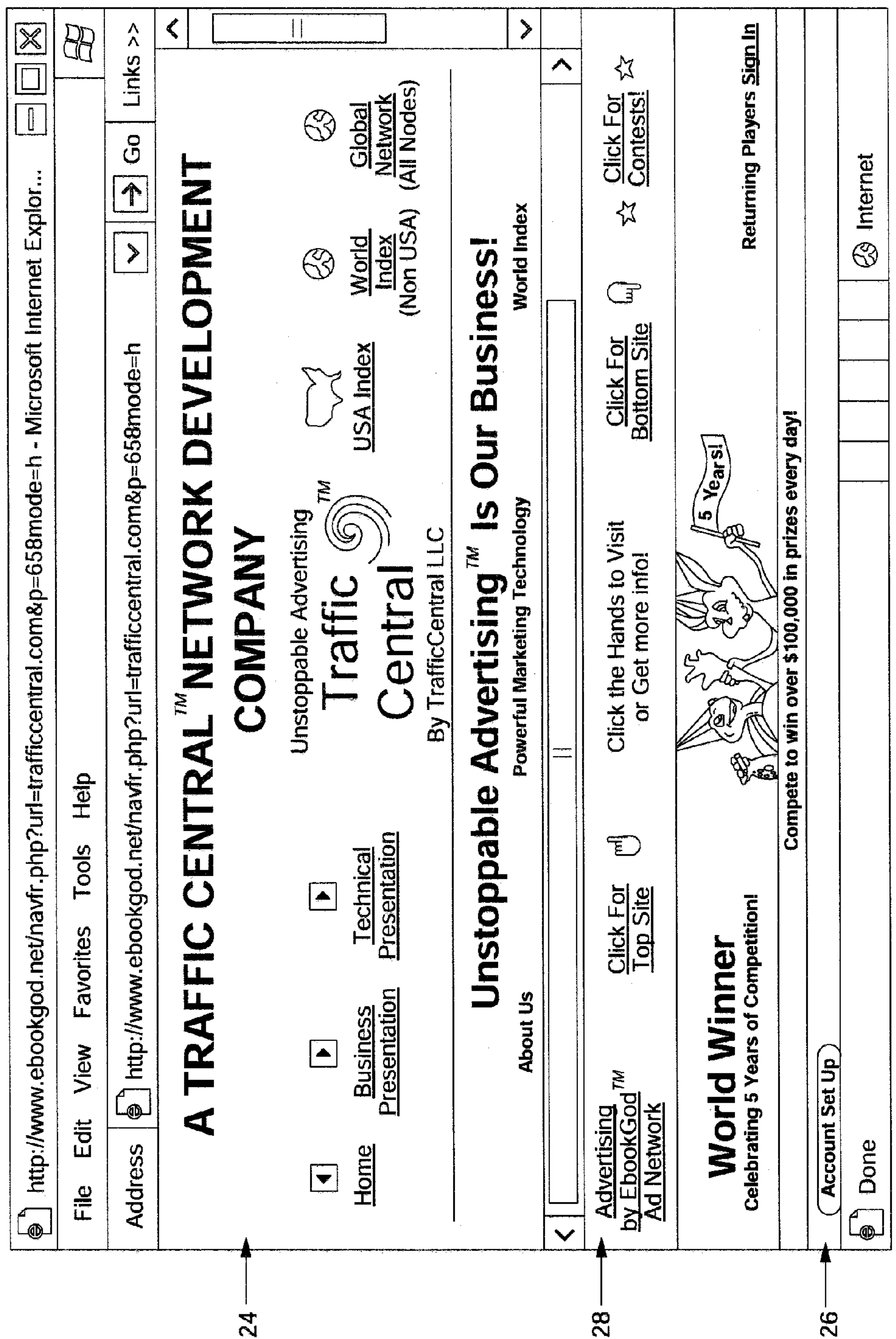

In the second example, the display area is split horizontally, to present vertically stacked frames as shown in FIG. 2*b*.

```
<! DOCTYPE XML PUBLIC “5//W3C//DTD XHTML 1.0//EN”
“prot://www.w3.org/TR/xhtml/DTD/frameset.dtd”>
<HTML xmlns=“ρrot://www.w3.org/1999/xhtml”> <BODY>
<FRAMESET ROWS=“50%, 48,*“ BORDER=1O”
FRAMEBORDER=“YES” BORDER=11I” FRAMESPACING=11O1>
<FRAME SRC=“prot://siteA.com/” NAME=“topFramel 111070160”
SCROLLING=“YES” NORESIZE />
<FRAME NAME=“navFramel 11070160” SCROLLING=11NO”
NORESIZ SRC=“prot://www.Sitel4.net/navscreenlx/navjBfli0.pliρ?
original=prot://siteA.coni/&fl=topFramel 111070160&f2=botFramel
111070160&website=prot://siteB.net” /> <FRAME
SRC=“prot://siteB.net” NAME“botFramel 111070160”
SCROLLING=“YES” noresize />
</FRAMESET>
</BODY>
</HTML>
```

In the foregoing examples, the term “prot represents the protocol that is used for the communications, e.g. hypertext transfer protocol (http) or hypertext transfer protocol secure (https), and the .php extension represents only one of many common implementations of a programming language that can be varied substantially for use as handlers for processing the URLs and arguments for the Source, System Resource Controller (SRC), and URLs of each frame within the exchange controller generated frameset (PHP is a recursive acronym that stands for PHP Hypertext Preprocessor, and the inner PHP stands for Personal Home Page). The header line containing DOCTYPE helps define Extensible Markup Language (XML) methods referring to the DTD, which participates in the XML document transformation process often referred to as Extensible Style Sheet Language Transformation (XSLT) transformation. This transformation process optionally results in a frameset tag set understood by many DTD targeted rendering devices such as can be reduced often to native XHTML or HTML frameset and frame tags. The xmlns specifier refers to the XML namespace required to properly render the content as well. However, the xmlns specifier and the tag set rendering transformation process overview is only an example. This implementation of the exchange controller's output and handling of documents from both an input and output perspective is however XML/XHTML capable and compliant. The tagset given is an example of an XML compliant set of tags. This tagset is only an example and it should be noted that the disclosed embodiment of this invention in the form of an advertising and content exchange controller is not limited to application of any markup language; and further that quick substitution of layout plans and templates will allow the exchange controller to digest and produce alternately formed content without any significant change to the embodiment. These specific examples may contain unimportant syntax peculiarities, and are only given as examples. The tagset includes fictitious URLs, which are given only for realistic illustrative purposes.

FIG. 2*a* illustrates an example of a vertically split window that might be displayed in response to the first example of a XHTML frameset generation stream presented above. As is conventional, the window optionally includes a title bar 16, as well as one or more menu bars 18, tool bars 20, and/or status bars 22, which might be selectively enabled or disabled by the user or through programming. The remainder of the window constitutes the display area. In the example of FIG. 2*a*, the display area is divided into three frames that are oriented in a columnar format. The left frame 24 displays primary content associated with the web page that was requested by the user or one of the other stimuli described previously. In the first example of the frameset generation stream presented above, the URL for this page is identified by the “SRC” tag. In the example, the content of the frame 24 is associated with the domain SiteA.com”.

The request for the desired content, or the subsequent display thereof, induces concurrent display of advertising or other secondary content, pursuant to an arrangement with the owner of the primary content page or via an arrangement with the exchange operator. Depending upon the business model, the stimuli to present the advertising or other secondary content can be applied by the primary content page, or it can be authorized by the primary content page owner allowing third party stimuli to trigger the generation of the frames. Throughout this specification, although advertising is used an example, any other secondary content may be substituted. For example, the second frame and/or other frames can be filled with information provided by one or more subscription services. As an example of a subscription service, perhaps the user subscribes to a service that sends the user one or more vocabulary words, news stories, and/or educational articles that are presented to the user in one or more of the plurality of framesets while the user is searching for other information.

For example, the plurality of frames may be populated with any information that was not explicitly requested by the user's search query. Another example of an application for multiple framesets is for sending an unstoppable emergency broadcast, which may be used by government agencies. In an embodiment, major content providers that are over a certain size may be granted or required to have the ability to redirect information through an exchange controller, which splits the browsing device. The primary content that was requested may be provided in one frame, and the emergency information may be provided in an alternate frame. Using multiple frames via framesets, emergency broadcasts may be provided that do not inhibit anyone from using the primary content requested. Depending on the severity of the emergency, the primary content requested may be blocked or displayed along side the emergency broadcast. In traditional non-emergency use, the subject matter, or other non-requested information, appearing in the advertising frame can be related to the information in the primary content page, or it can be entirely distinct, such as emergency broadcast information transmitted by a government agency.

The reaction of the exchange controller to stimuli by a network browsing device or alternate exchange controller is to select content based on the desired stimuli and then to respond. The selection of content is induced by a string pattern and/or by one or more stimuli, for example. The string pattern may represent a numeric advertiser ID or website ID. The string pattern may be located in the initiating code and/or may part of a related generated URL request to the exchange controller. The stimuli may be already formatted in an appropriate URL that includes content biasing identifiers, or a content selective communications request that selects one or more exchange controllers. The content selective requests may be in the form of arguments associated with a URL (using HTTP, sockets, or UDP level protocols, for example).

When a stimulus biases the content, the content that will be identified by the exchange controller for possible presentation may be only biased towards a set of information or advertisers, but is not folly determined by that stimulus. From this set of possibilities, the exchange controller selects a content provider, set of providers, or alternate content source (depending on the context and type of request made to the exchange controller). The final selection from local content and advertising inventory is based on other internal policies or criteria that extend beyond the original biasing criteria. Upon selection, the exchange controller then formats a response and responds to the stimulus, or in turn may relay a request to an alternate content exchange controller, which then repeats this selection process until the original request is ultimately fulfilled in a meaningful manner.

For example, if an advertiser's site or other network browsing device generates a request to the exchange controller that then triggers the frame based presentation of both primary content and a secondary form of advertising content, the biasing criteria for determining the second content may be the category setting of the advertiser's site or browsing device that triggered the request.

When content specific criteria is contained in the URLs as ID numbers or strings, the exchange controller does a database lookup according to the member ID, advertiser ID, or even category ID, other ID and/or other information to ultimately derive alternate required forms of the requested content used to select content or relay to alternate controllers. The conversion of the IDs or other information enables symbolic content selection criteria. The numeric values associated with the content in each exchange controller may vary substantially making it potentially ineffective to use local strings or number strings only known to an individual controller. Once content is identified, it is rendered directly or indirectly within one of the frames. Identifying appropriate content indirectly may involve determining that the content cannot be provided by a local exchange controller (e.g., server 14), and results in relaying the content request and related criteria to another server and/or another exchange controller for request fulfillment. Related to, and for purposes of, advertising content and inventory sharing among exchange controllers, an exchange controller may relay a request and its related criteria to an alternate exchange controller even if it can fulfill the request.

The right frame 26 displays the advertising that is authorized by, or induced by, the content page or equivalent stimulus, as provided from the domain "SiteB.info." The middle frame 28 in the illustrated example comprises a navigation frame, provided from a third domain, "Site14.net." This navigation frame includes control buttons or hypertext links 30 that can be clicked by the user to cause the content displayed in the left frame 24 or the right frame 26 to appear in a separate window or replace the content in the overall browsing device window depending on the rendering of the navigation buttons in the middle frame 28. The middle frame 28 also provides an area 32 that can be used to display additional advertising or multimedia entertainment, such as banners or videos.

It will be appreciated, of course, that the navigation frame 28 is optional. Depending upon the particular application, one or more of the advertising frames, any first content frames, and/or the other information frames can be eliminated as well. The function of the first content frames, advertising frames, and/or other frames is unaffected by the presence or absence of one another and/or the navigation frame, because they are logically independent of each other. While application and use of an empty frameset, or in other words a frameset lacking meaningful Internet URLs for presentation of some content in at least one frame, is impractical, the exchange controller has the capacity to provide such a frameset generation stream that is properly interpreted by a network browsing device and may show no errors but only an empty or meaningless window. From a practical use perspective, at least one frame within the frameset must be dimensioned to some or the entire portion of the display window and should contain an Internet URL referencing properly formatted and available content for presentation.

Various browser devices may allow for post-rendering resize of the various frames, or a future markup language may provide an option to allow post-rendering resize of the frames, and therefore varying the frame sizes to tightly collapse upon one another while still rendering the content, however by default not initially viewable, may be useful in some applications. An example of such might be presenting multiple web documents containing intended and alternate advertising content in frames on devices where exceptionally small amounts of browser window real estate is present. Examples of such devices might include cell phones, PDAs, or portable gaming devices. A practical consideration for use of the frame oriented aspect of this invention for advertising and content delivery, whereby the user anticipates or is directed to resize the frames by training, common knowledge, curiosity, or traditional use.

Related to potential use, the minimum visual presentation would be an advertiser's website or equivalent content, or an emergency broadcast web page or equivalent content provided by an appropriate and authorized source. The concurrent display of content, advertising, and/or other information in a single window can be implemented for the purposes of advertising or other purposes with as few as two frames, one of which displays the requested content and the other of which displays the advertising or other content, and/or one of which displays navigation. Furthermore, the locations of the primary content frame and the primary advertising frame and/or any other frames can be swapped without impact to any of the frames' functions or usefulness. Likewise, the relative sizes, styles, and shapes of the frames can be varied to any extent supported by the XHTML specification. For example, the frames can be round, ellipsoidal, triangular, hexagonal, polygonal, trapezoidal, in the shape of a rhombus, diamond, star, or any other shape. No matter the shape, there would be no change, or substantially no change, to the method of providing multiple frames simultaneously within a browser required to fully support any type of frame, such as round frames or any other shaped frame.

References herein to XML, XHTML, HTML, or any equivalent markup language, are ultimately considered exemplary and virtually identical with respect to implementation in the disclosed embodiments of the invention as long as the markup language provides the underlying frames, or equivalent containers for complete documents, and the overall technology provides an equivalent browser device rendering capability supporting the formed output. The markup language, while implemented for the common Internet and web browsers in the disclosed embodiment, is irrelevant in general. An example showing a clear divergence from the listed and currently supported markup languages can be a private or specialized implementation of this invention in an alternate customized embodiment such as an SGML equivalent with use of an SGML browser as the rendering device. Such an implementation would result in no significant change to the principles of the invention.

Returning to FIG. 1, the illustrated embodiment depicts one approach for retrieving the content that is to appear in each of the respective frames 24, 26 and 28. In this embodiment, the information that is displayed in the frames is provided by three respective network resources, such as servers. For ease of understanding, the three servers are illustrated in the figures as being implemented on three different physical devices, respectively. It will be appreciated, however, that any two or more of the servers can be resident on the same machine. In this specification, the term "server" refers to a process running on a machine, as opposed to the machine itself. The separation between servers is a logical one. For example, each server may be associated with a different domain name, or numeric or textual content exchange network node identifier, and there may or may not be physical separation as well between each server.

The features of the navigation frame 28 might be provided by a server at the same server 14 that returned the frameset generation stream. For this case, upon receipt of the frameset generation stream, the network appliance 10 sends a first request 2*a* to the server 14. This request may comprise the URL associated with the appearance of the navigation frame 28. In response, the server 14 returns the appropriate XHTML code in a message 3 *a*, to generate the appropriate display of the navigation frame 28 within the window. Of course, the information pertaining to the navigation frame can be provided by a server that is not executing on the server 14.

The information for the content frame 24 is provided by a content server 34 that is associated with the website requested by the user. In response to receiving the request (e.g., the URL for this website) in the frameset generation stream 1, network appliance 10 sends a request 2*b*, which may contain the URL, to the server 34. In a similar manner, the network appliance 10 sends a request 2*c* to an advertising server 36 that provides the advertising information that appears in the advertising frame 26. In response to requests 2*b* and 2*c*, content server 34 sends a message 3*b* which may contain the XHTML or HTML code for the content to appear in the frame 24, and the advertising server 36 transmits a message 3*c*, which may contain the XHTML or HTML code for the advertisement appearing in the frame 26.

While the example of FIG. 2*a* employs three frames, it will be appreciated that the display area can be divided into any desirable number of frames. For example, the owner of the website that provides the content appearing in the frame 24 may have agreements with three different advertisers. In such a case, the right portion of the display area might be divided into three, vertically stacked frames, each of which displays a separate advertisement. In this case, the advertisement in each of the three frames might be provided by a single advertising server 36, or multiple respective advertising servers 36, 38, etc.

The use of a frameset to present advertising provides a number of advantages. As discussed previously, prior techniques for displaying advertising typically employed browser-based scripting language to generate new logical layers for the ad space, e.g., items with new windows or stacking order considerations, pop-up windows, or XHTML divisions, layers, or other more susceptible tags or constructs. As a result, it became easy to separately identify and intercept the scripting or layers associated with various forms of web-oriented advertisement, and block them from being displayed, hi contrast, by using a frame to display the advertising, the code that is sent to the rendering device, such as a browser, is native to the XHTML and HTML core language specification at a most granular and atomic level, and operates without developing a new primary layer or window. As such, it becomes significantly more difficult to determine advertising streams and thus more difficult to prevent the display of the intended website or equivalently formatted advertising. In order to do so, it would become necessary to change the international language specification for XHTML and HTML, to support disabling the display of frames, which is highly unlikely, as it would negatively impact the entire World Wide Web.

The frame-based advertising allows for display of multiple full XHTML or HTML document content in simultaneously presented frames and is not limited to rendering a single complete document. This form of advertising is not limited to display of specific incremental entities, such as images or custom multimedia objects, as found in the other traditional forms of Internet advertising. The approach described herein displays any properly formatted XHTML or HTML content document in total in each frame, which can include any number of device-supported incremental entities. Advertising by frames provides complete transparency to the content that is actually rendered inside each of the frames. In addition, there is no special programming required to support the presentation of full XHTML or HTML documents in each frame, since framesets are part of the core XHTML and HTML language specifications and supported widely by browsing technologies. Utilizing the techniques of the present invention, browser-based scripting is not necessary to induce the display of advertising, hi fact, a web browser scripting interpreter/processor can be disabled, and the advertising will still appear.

Since the advertising frame appears at the same logical layer as the web page that originally induced the advertising, the display of the advertisement is more persistent. As a result, the user is likely to spend more time looking at the original website and the advertisement, both consciously and subconsciously, in conjunction, because of the manner in which they are presented. To illustrate the generic application of the advertising approach contained in this invention, it must be noted that the use of iframe tags, often referred to as floating frames, can be used to mimic this form of advertising. However, it is already known that software designed to focus on blocking iframes exists. Iframes are inline frames, which can be used as a target. Iframes are logically at a different logical layer in most modern rendering devices, whereas in contrast the choice of framesets and frame tags is more atomic and rudimentary and no blocking technology is currently known to exist. Consequently, advertising via frame sets may be a more reliable form of advertising than iframe tags.

Figure 3:
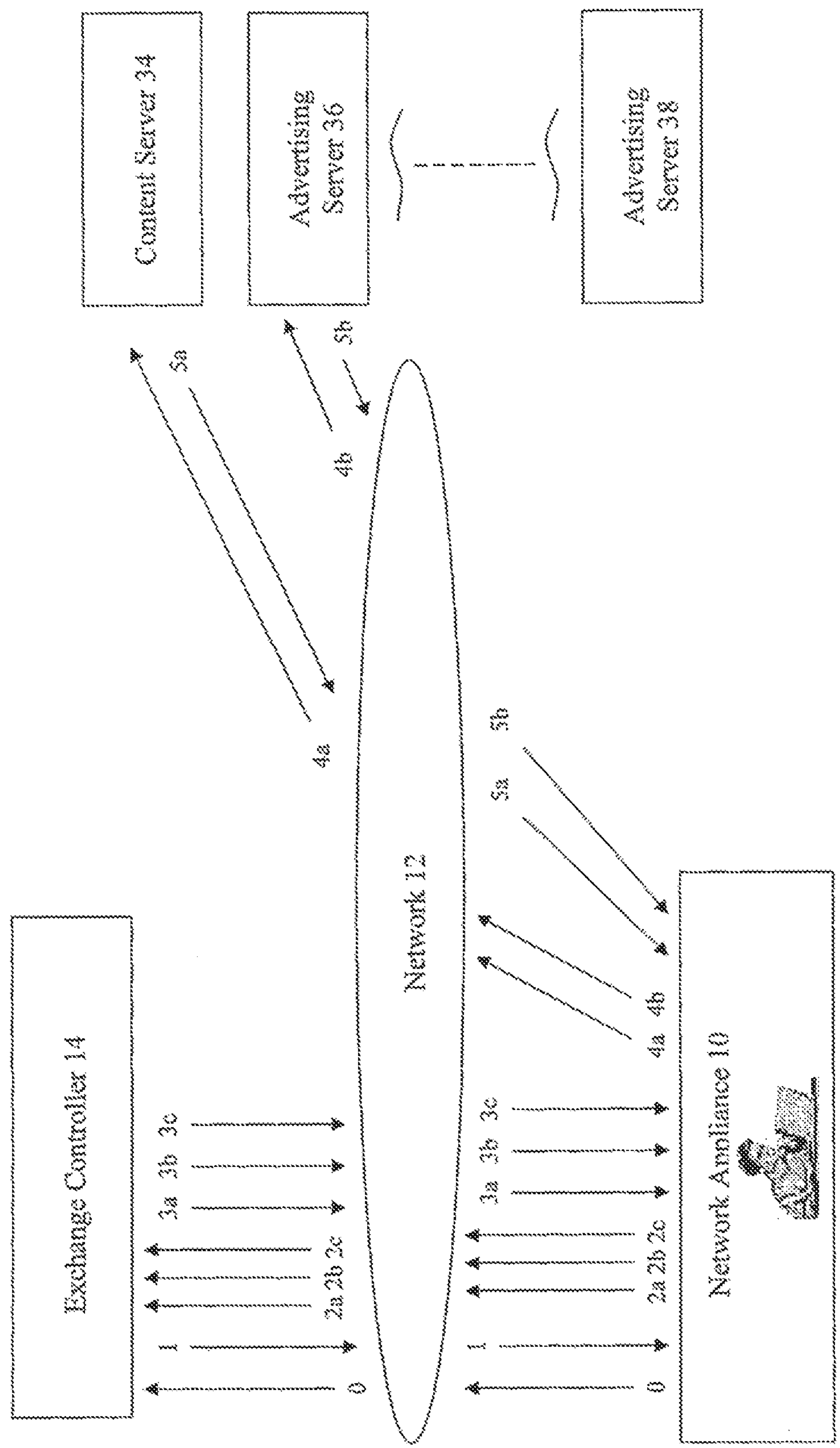
FIG. 3 is a schematic view of a second embodiment of a network exchange in accordance with the present invention.

In the example of FIG. 1, once the frameset generation stream is received from the server 14, the browser or other XHTML-rendering device directly transmits requests to the respective servers that provide the content that appears in each of the frames. It has been found that certain implementations of XHTML rendering technologies are not well suited to perform this operation in a robust manner. To circumvent technical difficulties presented by these types of technologies, an indirect approach can be employed to obtain the appropriate content. An example of this approach is illustrated in FIG. 3. In the indirect approach, the initiation of the process begins in the same manner, with the transmission of a request "0" from the network appliance 10 to the server 14, and the return of a frameset generation stream from the server 14 to the network appliance 10. In FIG. 3, however, the XHTML code of the frameset generation stream does not contain the URLs that are directly associated with the content server 34 and advertising server 36. Rather, in the embodiment of FIG. 3 the URLs that pertain to the content of the frames are each associated with the server 14. Thus, for instance the SRC tag for the left frame 24 in the example of FIG. 2 might appear as prot://www.Site14.net/popsite.php?website=prot//SiteA.com/", where Site14.net is a domain associated with the server 14 and prot is the protocol specifier, which is common on the Internet as http or https. A similar type of tag can be employed for the right frame 26.

In the example of FIG. 3, therefore, each of the messages 2*a*, 2*b* and 2*c* is transmitted to the server 14. As in the example of FIG. 1, if the server 14 is the provider of the content for the navigation frame 28, this content can be directly returned to the network appliance 10, in the form of message 3 *a*. In response to requests 2*b* and 2*c*, the server 14 transmits HTTP Location header redirect requests to the browser on the network appliance 10. These header redirect requests are represented as messages 3*b* and 3*c* in the example of FIG. 3.

Briefly, the "redirect" feature of the HTTP protocol provides redirection status codes that a server can employ to indicate to a browser device that it should look for a desired page at another URL. This other URL is specified in the Location" HTTP header. Therefore, in the example of FIG. 3, messages 3*b* and 3*c* contain redirection status codes and Location headers that identify the URLs associated with the content server 34 and advertising server 36. Upon receiving these header redirect messages, the browser on the network appliance 10 sends new requests 4*a* and 4*b* to the content server 34 and advertising server 36, in accordance with the URLs in the Location headers of the messages 3*b* and 3*c*, respectively. In response, the servers 34 and 36 return the desired content 5*a* for the content frame 24, and the advertisement data 5*b* for the advertising frame 26, respectively. Thus, as long as the browser, or other XHTML-rendering module, supports HTTP header redirects, the appropriate information will appear in the respective frames of the display area.

The URLs associated with the server 14 can be directed to multiple parallel exchange controllers for scalability, reliability, and performance. Examples of such an implementation would be to workload balance the server 14 through available and current technologies or methods such as High-Availability Clustered Multiprocessor (HACMP) solutions or simple DNS rotation appliances, or other workload balancing schemes and devices currently available, hi a more direct manner, the initial exchange controller can programmatically direct the base URLs in the frameset generation stream 1 to alternate known exchange servers at the time of generation.

Of course, it is possible to use techniques other than HTTP Location header based redirection to implement the indirect approach. For instance, browser side scripting might be employed. In such a case, a script can be employed to initiate the construction of the frames locally at the browser. It then becomes possible to initiate a "window.location==" construct in the script, to perform the redirection instead of an HTTP header redirect. In this situation, however, a scripting language must be enabled. The exchange controller presented supports both of these methods of redirection.

Figure 4:
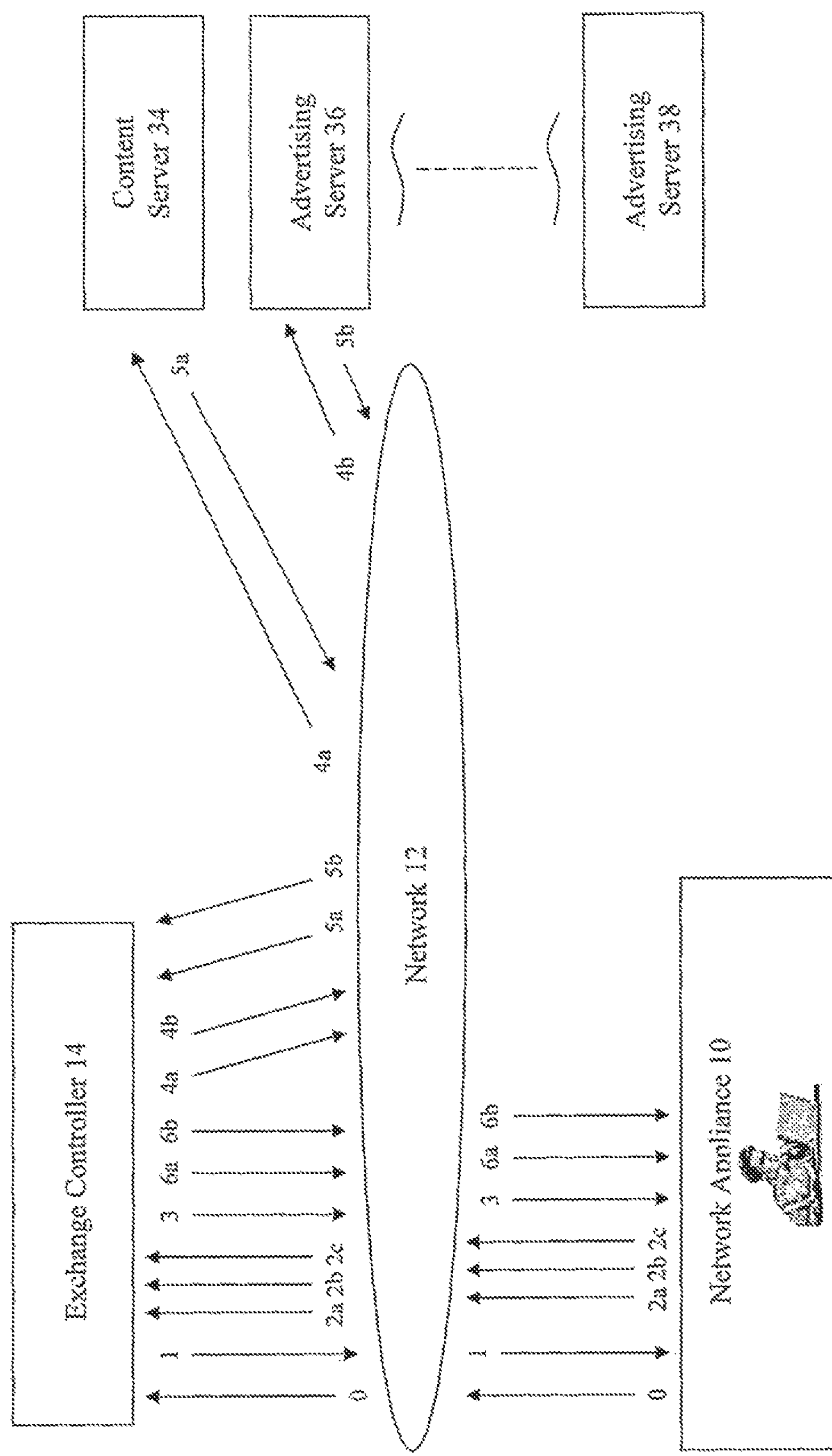
FIG. 4 is a schematic representation of a third embodiment of a network exchange in accordance with the present invention.

The embodiments of FIGS. 1 and 3 utilize http or https as the protocol for communications with the content delivery servers. Another indirect approach that supports other protocols is illustrated in FIG. 4. In this embodiment, server 14 plays an active role in retrieving and providing the content to the browser running on the network appliance 10. As in the example of FIG. 3, when the browser receives the frameset generation stream in the message 1, it sends three requests 2*a*, 2*b* and 2*c* to the server 14. In response to request 2*a*, the exchange controller supplies the content for the navigation frame directly to the browser, via the message 3. In response to requests 2*b* and 2*c*, the server 14 sends requests 4*a* and 4*b* to the web server 34 and advertising server 36, respectively. These two servers return the appropriate content for the respective frames to the server 14, by way of messages 5*a* and 5*b*. Upon receipt of these messages, the exchange controller then provides the content to the browser on the network appliance 10, via messages 6*a* and 6*b*.

In the embodiment of FIG. 4, the server 14 is of a type that can use an alternative protocol, such as UDP, and TCP socket level communication to retrieve the desired content and advertisements from other like exchange servers. The servers that it connects to can be the endpoint content delivery servers, or intermediate exchange servers. Once the server 14 receives the requested XHTML or XML streams from the other servers via any of a suitable number of supported protocols, it then forwards the entire stream to the browser on the network appliance 10 by means of the open http connection between them.

One of the optional attributes for a frame contained in a frameset is "name". In the examples of XHTML codes for frameset generation streams given previously, the content frame 24, navigation frame 28 and advertising frame 26 are given the names "leftFrame1 111070204", "navFrame1 111070204" and "rightFrame1 111070204", respectively. In each of these frame names, the value "1111070204" is a randomly generated number. The number can vary across each of these three names as well, as it is not important for them to be synchronized but is simplified here for illustrative purposes. A new random number is produced each time a frameset generation stream is transmitted. The use of a randomly generated number for the frame name further thwarts efforts to block advertisements.

For instance, once the use of frames to present advertising becomes known, some tools may attempt to block frames having a name or URL associated with an advertiser's website or content intended for presentation in the respective frame. By changing the names of the frames with random numbers or other forms of randomized text strings, such blocking efforts are rendered ineffective. The textual portion of each frame name, e.g. "leftFrame", can be static, or it can also be randomly varied with each new frameset generation stream. From the foregoing, therefore, it can be seen that providing advertisements via frame sets provides a unique mechanism and system for presenting advertising over the Internet and other network-based computer systems that is expected to be less susceptible to being blocked than other known techniques for doing so.

Displaying advertisements in frames that are at the same effective layer, relative to the browsing device's window, as the original web page or human stimuli that induced the system to display the advertising, has the effect that the native XHTML equivalent core language specification contains the advertisement and not a composite function or object that can be more easily identified during processing and sensed. Having the advertisement contained in the XHTML equivalent core language is expected to make it more difficult to separate the advertisement display mechanism, and thus the advertisement, from other associated or desired content. In addition, or alternatively, the exchange controller communicates with other exchange controllers in an intelligent manner in that, if appropriate content is not found at one of the exchange controllers, or if one or more or the exchange controllers is configured to directly route requests to other exchange controllers, stimuli is passed to alternate exchange controllers when required. Communicating with other exchange controllers effectively increases the local exchange controller's virtual content inventory of appropriately selectable content. This intelligent sharing of content among these intelligent exchange controllers produces a transparency of location of the content to the original human surfer or other machine-oriented stimuli.

The presentation of advertising using this method and/or intelligent exchange controller may have another unique advantage to Internet website owners that is non-obvious even after review of the core methods and exchange controller system. The business benefit is that website owners can participate in a cooperative advertising solution that allows them to eliminate all advertising content from their website, reserving full display area for their real business content. Utilizing the entire display and web page space for primary content while still periodically displaying advertisements may be accomplished by the exchange controller's use of time based control of the periodicity related to the production of the frameset generation streams as released by the exchange controller.

To prevent inappropriately spurious or annoying advertising, the exchange controller is adjustable by the exchange administrator to periodically ignore stimuli for a period of time just after an ad has been generated by stimuli from a particular IP address. There may be a time delay variable associated with the period of time during which stimuli are ignored. Changing the value of the time delay variable may change the time period during which the stimulus is ignored. The value of the time delay variable, which stimuli are ignored, and/or which exchange controllers are ignored may be different for different users. The time delay value may be adjusted by the exchange controller administrator and/or user if allowed by the exchange administrator or the business operator's respective policies, the advertiser or other provider of secondary content may adjust how often ads or other secondary content are presented. Adjusting the timing delay value, thereby leveraging the periodic display of secondary content, gives advertisers and others an advantage in eliminating web advertising content directly from their web pages.

Additionally, adjusting the timing delays makes their web page, sometimes implemented as what is known as a doorway page, the content provider's own advertising content for use as an advertisement as displayed by other content providers (e.g., advertisers) that reciprocate with one another (which could be referred to as reciprocal content providers or reciprocal exchange controllers) by providing content to one another within a network of Internet advertising exchange controllers.

Controlling the reciprocal exchange of advertising content in this manner has business value since special formatted advertising content is no longer required, because the entire web page document becomes the advertisement displayed in the alternate frame. Consequently, no custom ads, banners, flash, etc, are needed. Additionally, advertising by use of frames for displaying primary content, and secondary advertiser's content, in this reciprocal manner may allow some website advertisers to advertise even though they cannot modify or add advertising content to their web page. For example, when the advertiser advertises by using a replicated affiliate website page, the same web page is displayed by the competing affiliate advertisers. An affiliate E) is passed within the URL, which is the only way to discern one affiliate from the other affiliates that use the same page. The replicated affiliate page is generated and modifiable only by the affiliate system owner. By presenting replicate affiliate websites to users via exchange controllers, and consequently within a frame of a frameset, replicate affiliate websites can participate cooperatively in a reciprocal advertising cooperative exchange network, which could not be done previously.

Using time delays is an optional feature of the frame based advertising exchange controller and system that further entices advertisers that are leveraging replicated advertising sites and the like to participate in this model of cooperative and reciprocal advertising. Simultaneous advertising and participation in the reciprocal advertising system is accomplished by the display of the replicated affiliate site in the primary content frame produced by this system, and by displaying alternate advertising content (which maybe a reciprocal advertiser's website content or doorway page) in the secondary frame.

The primary and secondary content are complete web documents originally provided by the advertiser and the secondary reciprocating advertiser indirectly through the system, which is centered on the exchange controller. By varying the frequency of these presentations, a primary advertiser, or advertiser using the replicated affiliate website, can control the frequency of participation in the reciprocal exchange system. This is advantageous in reducing the cost of advertising whereby participating in a reciprocal exchange program commonly derives free advertising credits or reduces the cost of advertising credits.

In addition to time delays between the generation of frameset streams, or as another alternative, a cookieless latch is facilitated. Many consumers disable cookies on their browsing devices. The cookieless latch implements a memory queue related to recent stimuli, types of stimuli, and mapped in particular to network browsing devices based on the IP address of each device originating a request. The cookieless latch caches the required data in memory for a period of time as determined by the system administrator. It therefore delays/controls the transmission of frame generation streams to any network device. For example, if the same request from the same origin identified by IP address and stimulus type, representing a particular type of ad, exists in the memory of the cache, the system will not respond with a frame generation stream. The cookieless latch thereby controls the periodicity of ad presentation, as well as eliminates the common problem of spurious ad generation upon uncontrolled repeated stimuli by a network-browsing device caused when its cookies are disabled. It should be noted that the cookieless latch mechanism and functionality in the disclosed embodiment of the invention is not limited to frame-based forms of advertising exchange controllers only and application to other advertising exchanges would be highly useful.

The business of advertising on the Internet often involves an advertiser's purchase of ad credits representing a display of their website or ad to a surfer on the Internet. Without the cookieless latch, spurious presentation of the ad or website occurs and inappropriately consumes advertiser's purchased advertising. One other problem that plagues the Internet is exchange mechanisms or stimulus devices often embodied as a computer program known as hit generators or AutoSurf exchanges. These devices are intent on stimulating advertisers' websites mechanically and automatically without a human being involved, and are often used to improperly inflate a website's traffic oriented ratings while inappropriately consuming advertisers' dollars indirectly by consumption of the ad credits. As such an advertiser's credits are consumed without actual human beings seeing the website. The result of this is exceptionally poor sales conversion ratios for the amount of advertising dollars and volume of advertising implemented during a marketing effort.

A logic and protection system may be included in an exchange server that works in conjunction with properly programmed stimuli devices and reduces the likelihood of inappropriate consumption of advertising credits. The browsing device is enabled to indicate to the exchange controller when it is appropriate to deduct a credit based on human stimulus only and further makes provisions so that advertising can still be presented autonomously without indicating credits may be deducted. An exchange controller may have logic embedded with appropriate communication protocols in place so that browser devices can be trusted to trigger credit deductions only when it is expected that a human being is actually present and interacting with the web browser. The browsing device runs both autonomously or manually, but only signals the exchange controller to deduct credits when an interaction occurs that is expected to be a uniquely human interaction with the device.

For example, stimuli may be triggered when a field associated with the GUI of the browsing device is filled in. Alternatively, a deduction in credits of an advertiser's account by the exchange controller may not be triggered unless a message is received from the browser explicitly indicating that the browser is controlled by a human. For example, the message may be encrypted and may be nothing more than "this message is to confirm that the preceding interaction was triggered by a human," or the message may be a series of signals that have no meaning, but that match a stored message in the content exchange controller, and the content exchange controller checks for the match prior to deducting a credit (and no credit is deducted if there is no match). After stimulus that is expected to be human in origin is received, messages (which are optionally encrypted) are passed to the content exchange controller indicating a credit should be deducted. The default is to not deduct, and proof must be given by the browsing device that the interaction is human in origin prior to deducting a credit from an advertiser's account.

An exchange controller may include a facility to export a formatted and raw list of advertisers. Exporting the inventory list of advertisers has an advantage for increasing generic link ratings, and targeted link ratings, for advertisers. Link ratings are a measurement commonly used by search engines and potential advertisers to determine the value and usefulness of a site. Link ratings are ratings assigned to web entities (e.g., websites or web pages) that characterize the link counts associated with that web entity. Link counts are how many other sites reference a particular site. Generic link ratings refer to all sites that reference a particular site, where as targeted link ratings refer to how many similar content sites reference a particular site. When a particular site also references all other sites that refer to it, it is then considered perfectly cross-linked with all of the other sites. The exchange controller provides software or scripting that a website owner may leverage to trigger the cross-linkage. This is managed by a centralized device or server collecting and constructing a composite list of all appropriate advertisers within the distributed network of content prevalent exchange controllers and then allowing individual advertisers to use the centralized information by referencing the entire list of advertisers by various means. Link enhancement (which is enhancing the link ratings) of the advertiser's website is accomplished by inserting scripting into a searchable page on the website or by embedding a link to the composite list onto a web page of their site, or by other similar means.

An alternate method of implementation is by publishing a valid web document that contains all of the other appropriate advertisers' website URLs and can be relocated to the advertiser's website and integrated by a normal HTML URL reference. By doing so, the rating engines on the Internet see each advertiser's site that participate in this solution as grossly cross-linked either indirectly or directly thereby increasing the individual website's link rating substantially.

Figure 5:
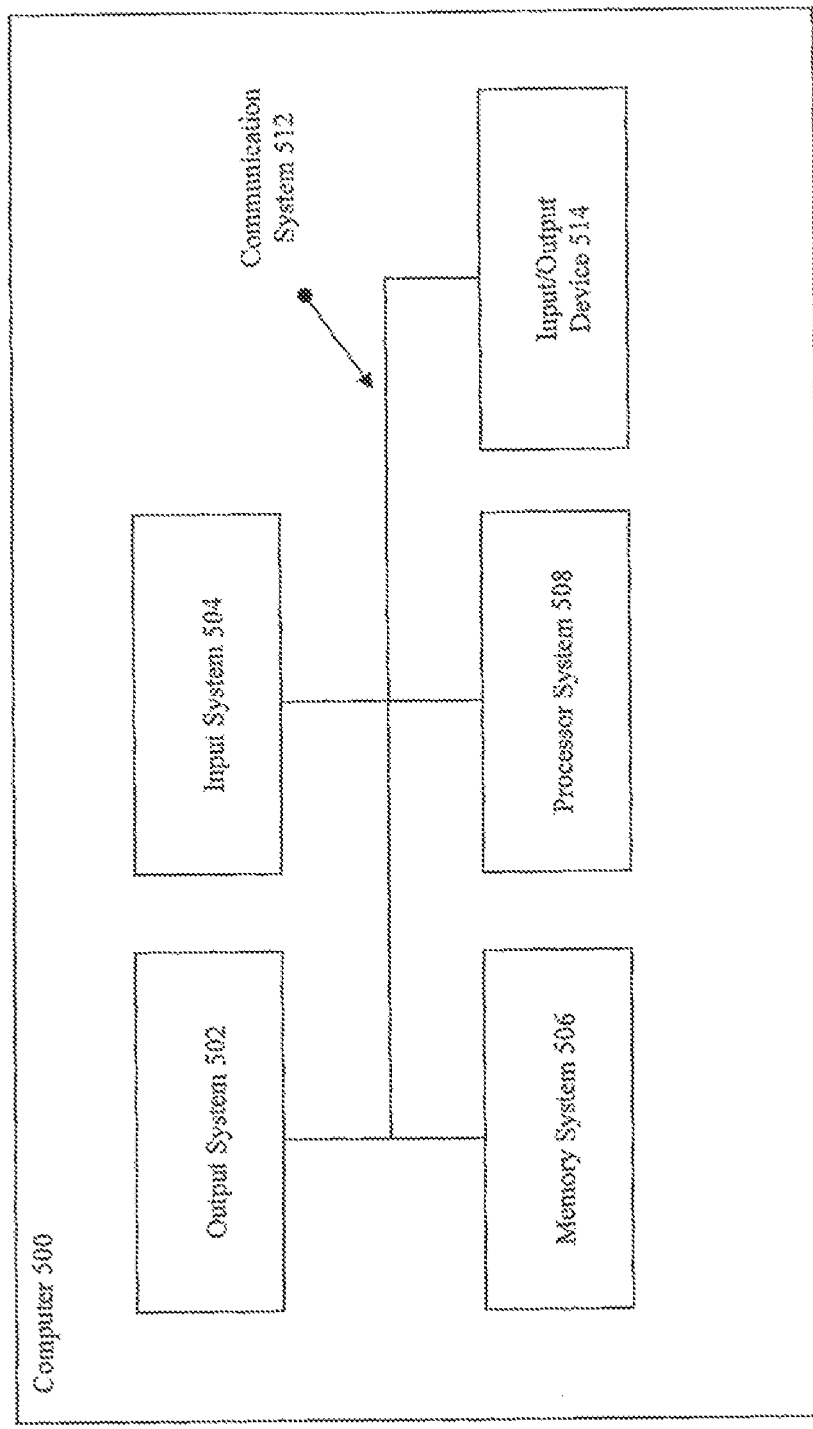
FIG. 5 is a block diagram of a hardware platform embodying one implementation of the exchange controller.

FIG. 5 shows a block diagram of a computer 500, which may be used as network appliance 10, or may host an exchange controller 14, content server 34 and/or advertising server 36. The computer 500 may include output system 502, input system 504, memory system 506, processor system 508, communications system 512, and input/output device 514.

Output system 502 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example.

Input system 504 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example.

Memory system 506 may include, for example, any one of, some of, any combination of, or all of a long term storage system, such as a hard drive, a database system, a short term storage system, such as random access memory, a removable storage system, such as a floppy drive or a removable drive, and/or flash memory. Memory system 506 may include one or more machine-readable media that may store a variety of different types of information. The terms machine-readable media, or machine-readable medium, are used to refer to any medium capable of carrying information readable by a machine. One example of a machine-readable media is a computer-readable medium. Another example of a machine-readable medium is paper having holes that are detected that trigger different mechanical, electrical, and/or logic responses. The term machine-readable medium also includes media that carry information while the information that is in transit from one location to another, such as copper wire and/or optical fiber. Memory system 506 may store one or more computer instructions that cause a processor to carry out steps that implement a browser, server 14, content server 34, and/or advertising server 36.

Processor system 508 may include any one of, some of, any combination of, or all of multiple parallel processors, a single processor, a system of processors having one or more central processors and/or one or more specialized processors dedicated to specific tasks. Processor system 508 carries out the instructions stored on memory system 506.

Communications system 512 communicatively links output system 502, input system 504, memory system 506, processor system 508, and/or input/output system 514 to each other. Communications system 512 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Input/output system 514 may include devices that have the dual function as input and output devices. For example, input/output system 514 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 514 is optional, and may be used in addition to or in place of output system 502 and/or input device 504.

Figure 6:
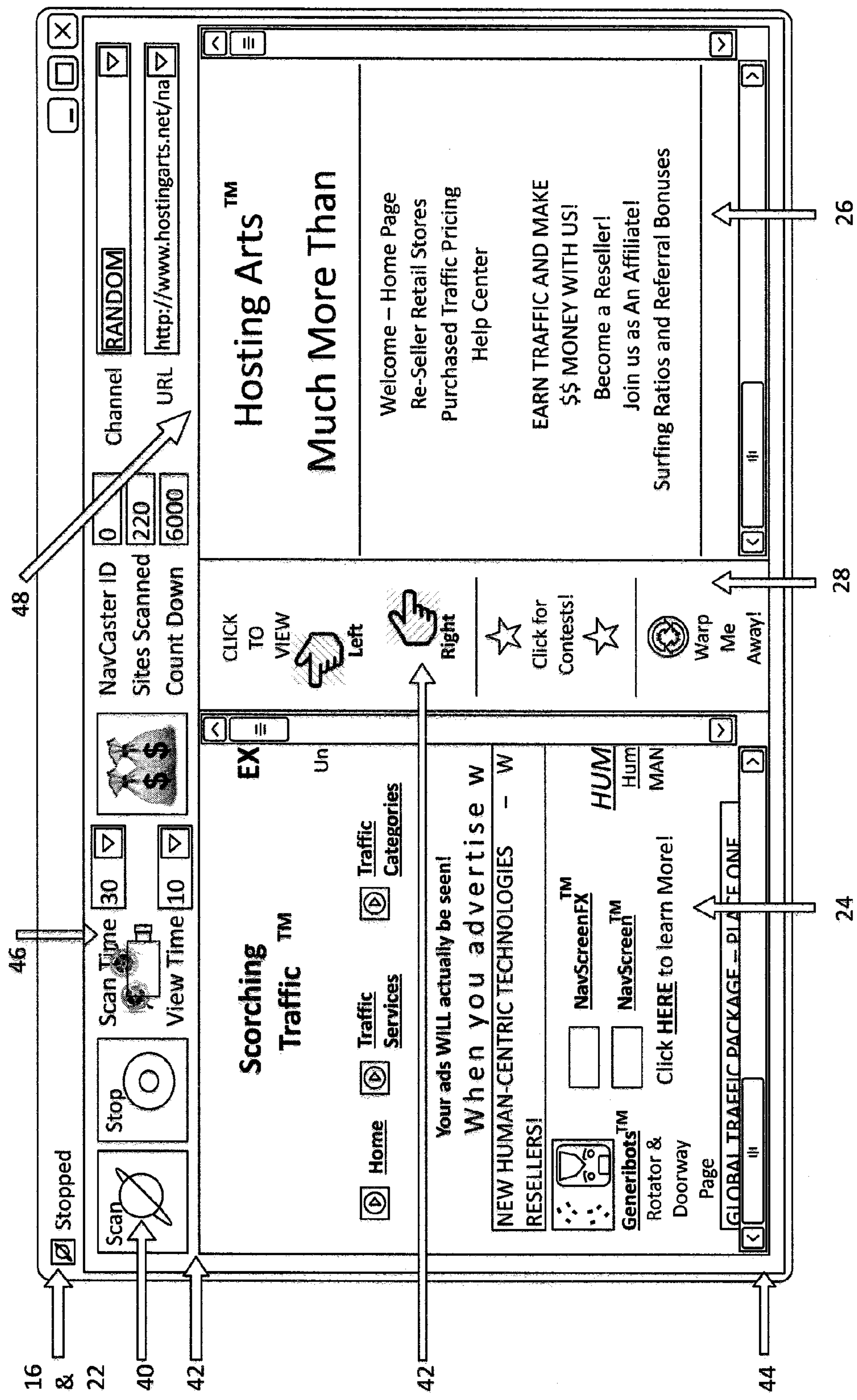
FIG. 6 is an image of the window area of a network browsing device that interacts with the network exchange controller and is sensitive to human stimuli.

FIG. 6 depicts a window displayed by a network browsing device that has rendered three separate HTML/XHTML documents in three separate frames within the overall screen real estate used for presentation (browser window). This browsing device interacts with the content exchange controller by signaling the controller when a human is expected to be interacting with the browsing device as compared to when a human is not interacting with the browsing device. Key aspects of this figure indicate that entire web documents (website pages) are rendered in each of three frames, with the left frame scrolling enabled, center frame scrolling disabled, and right frame scrolling enabled. In addition, the center frame and document rendered within it is referred to as navigation. The left frame will be referred to as primary content, and right frame be referred to as secondary or advertising content. The size and position of these frames may be varied as previously shown in FIGS. 2, 2*a*, and 2*b*, and are not key features of this figure. A special attribute of the network browsing device that interacts with the exchange control is its ability to detect the presence of a human and transmit credentials to the exchange controller that allow the exchange controller to understand when a human is expected to be present and not present. Because of this facility inherent to this device, it is referred to as human sensitized network browsing device.

FIG. 6 details several exemplary features of a human sensitized network browsing device for use in this application. The title bar (16) and status bar (22) are combined in functionality within this device. The menu area (18) and tool bar area (20) assist the user to select and stimulate content presentation. The presentation areas of the left frame for primary content (24), the middle frame for navigation content (28), and the right frame for secondary or advertising content (26) each render entire valid HTML/XHTML/XML documents within them.

Several features of this device are generally considered to form a GUI (Graphical User Interface) for a human to interact with. However the graphical features of the navigation or control of the device are unimportant. A significant aspect of the human interface features is the device is sensitized to transmit appropriate signal information to the exchange controller when a human directly interacts with the device. In this embodiment, the scan button (40), the window (44), the tool bars (20) and menu(s) (18) are predetermined to transmit special signals when interacted with. However, other areas and features of a different embodiment of a human sensitized network browsing device may also be designed to transmit analogous signal information to the exchange controller, hi addition, there are internal timing mechanisms that allow this device to interact autonomously with the exchange controller to acquire and display content much like a television would do for entertainment purposes.

During a period when automated operation occurs, for example for the purposes of general network observation, research, monitoring, entertainment, or other similarly passive activity occurs, the device does not convey information to the controller that a human (user) is present, but may convey information such as IP addresses, source location information, demographic information, or channel selection as can be seen in the upper right portion of the tool bar (20) above the right frame (26). Further, it can be anticipated that an embodiment of such a device can convey environmental information to the exchange controller such as device temperature, source location environment characteristics, or the geographic position of the browsing device for consumption by the exchange controller in determining content, for example.

An example of the economic benefit of this function of the sensitized network browsing device may be to stimulate the exchange controller to dispatch content and advertisements to the user that would help the user improve environmental conditions. In this example, because of the implied potential benefit and relevance to the user, both the content and advertising may be considered targeted. This aspect of the extensibility of the network browsing device and its composite interaction with the exchange controller to improve the targeting of content and advertising is only limited by input mechanisms inherent in a physical manifestation of such device. Other embodiments may be extended to leverage any new I/O (Input/Output) made available to the device. In this manner, the exchange controller can enhance targeting of the content and advertising, as well as textual messages or imagery in the navigation or other documents presented in the frames displayed in the device window. As previously noted, the number of frames for untargeted and targeted content and advertising may be increased or reduced without impact to the function of each frame or the overall device.

Figure 7:
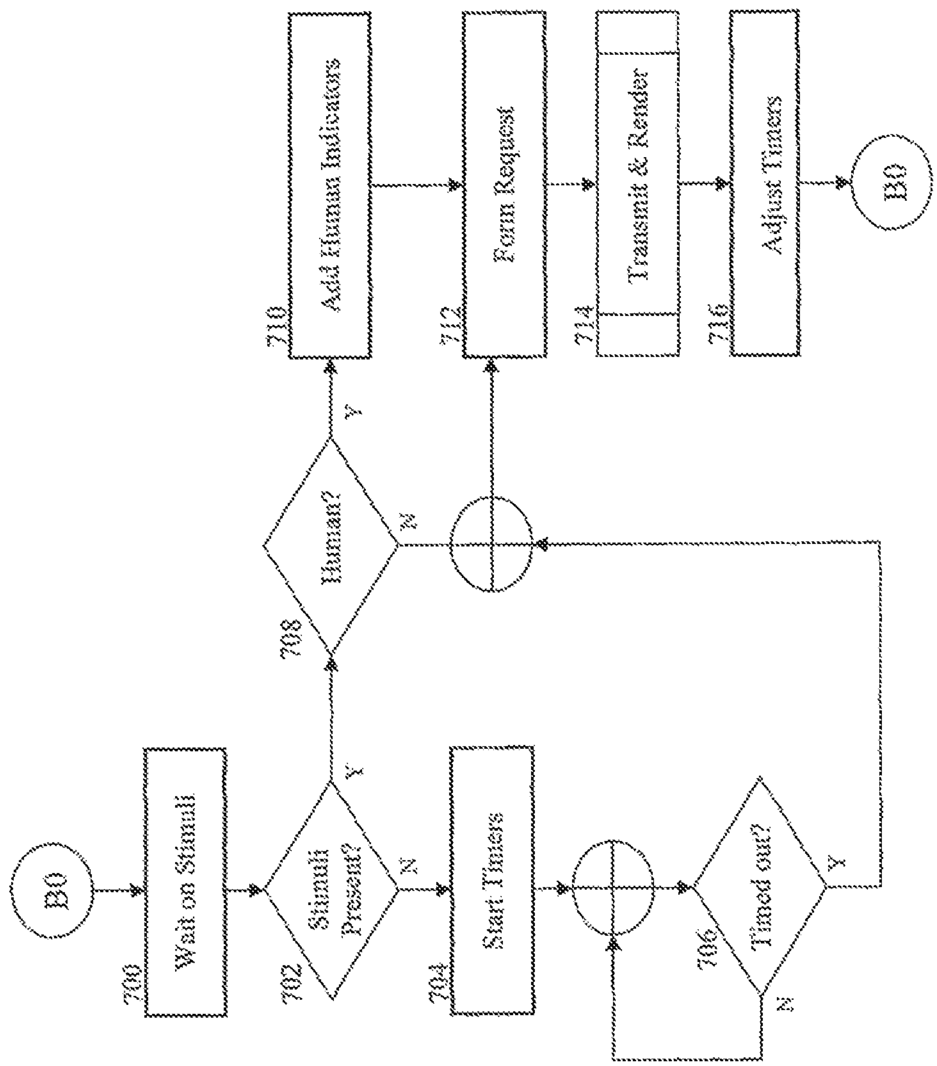
FIG. 7 is a flow chart of a request process by a network browsing device that has been enhanced to sense human stimulus and convey related awareness during transactions with a network exchange controller.

FIG. 7 is a flow chart of the general processing of the network browsing device (10). At start (BO) the device may wait on stimulation (700) from a human or timers. The test for stimulation present (702) may be complex and parallel in nature, testing several inputs such as the GUI features or internal I/O or timers. Upon presence of stimuli, an inherent test for human presence (708) may occur and result in the addition of indicators (710) to the request (712) the network browsing device may make to the networked exchange controller. After forming the request (712), the network browsing device transmits the request (714) to the network exchange controller by whatever means the natural communication between the device and exchange controller is embodied by. In the general case, an Internet level request is made through one of several supported protocols. The composite process of transmitting and rendering (714) encompasses the request conveyed to the network exchange controller, the response of content from the controller, and the rendering of the content traditionally in the frames asserted by the frame generation stream returned by the controller. Upon receipt and rendering, the network browsing device may start or reset timers (716) to enable automated stimulation upon timeout for the next request-response-rendering transaction cycle. The value of the timers that is used may be relative to the GUI controls (46) of network browsing device interface as depicted in FIG. 6 or by predetermined values based on implementation, adjustments for embodiment technology, or intended usage.

The next cycle repeats at an initial state represented by a wait for next stimuli (700) by returning to an initial or adjusted starting condition (BO). During this or the preceding cycle, if the device is not interacted with through any of the several human sensitized triggers (GUI, buttons, menus, window resizing, or other), timers are started (704) to provide automated stimulation. A test (706) to see if the wait timers that control automated operation have timed out occurs, and iterates until the timers reach a predetermined threshold when stimulation is acknowledged and allowed, thus inducing non-human stimulation.

In the disclosed embodiment, separate timers are used to indicate the time to wait for rendering of content, and then the time to wait after rendering of content. While these are effective and useful, other timers may be introduced, for example, on a per frame basis. While the disclosed embodiment allows the timers to apply to all frames, this is not a limitation of the overall processes and content delivery and advertising system. Upon stimulation by a compatible network browsing device, the exchange controller request-response cycle is initiated. The browsing device can be enabled to maintain state with the network exchange controller, or to operate in a stateless environment such as the Internet via http/https protocols, without diverging from the spirit of the application and system, hi fact, the disclosed embodiment may operate in either a state-free or semi-stated (use of browser or server cookies as is optional or for convenience in specific implementation) environment for support of various features of the overall content presentation system. For illustration, the content presentation system refers to the combined embodiment and function of the network browsing device, the exchange controller(s), and the optionally distributed content and advertising servers.

The network or equivalent communication conduit among the components of the content presentation system is assumed to exist and interact appropriately with the various components considered in this application, but the network, analogous communication conduit, and network or wiring level communication protocols that operate within such conduit, are not considered to be part of this application, hi an embodiment, application may be based on the Internet as a communication conduit.

Figure 8:
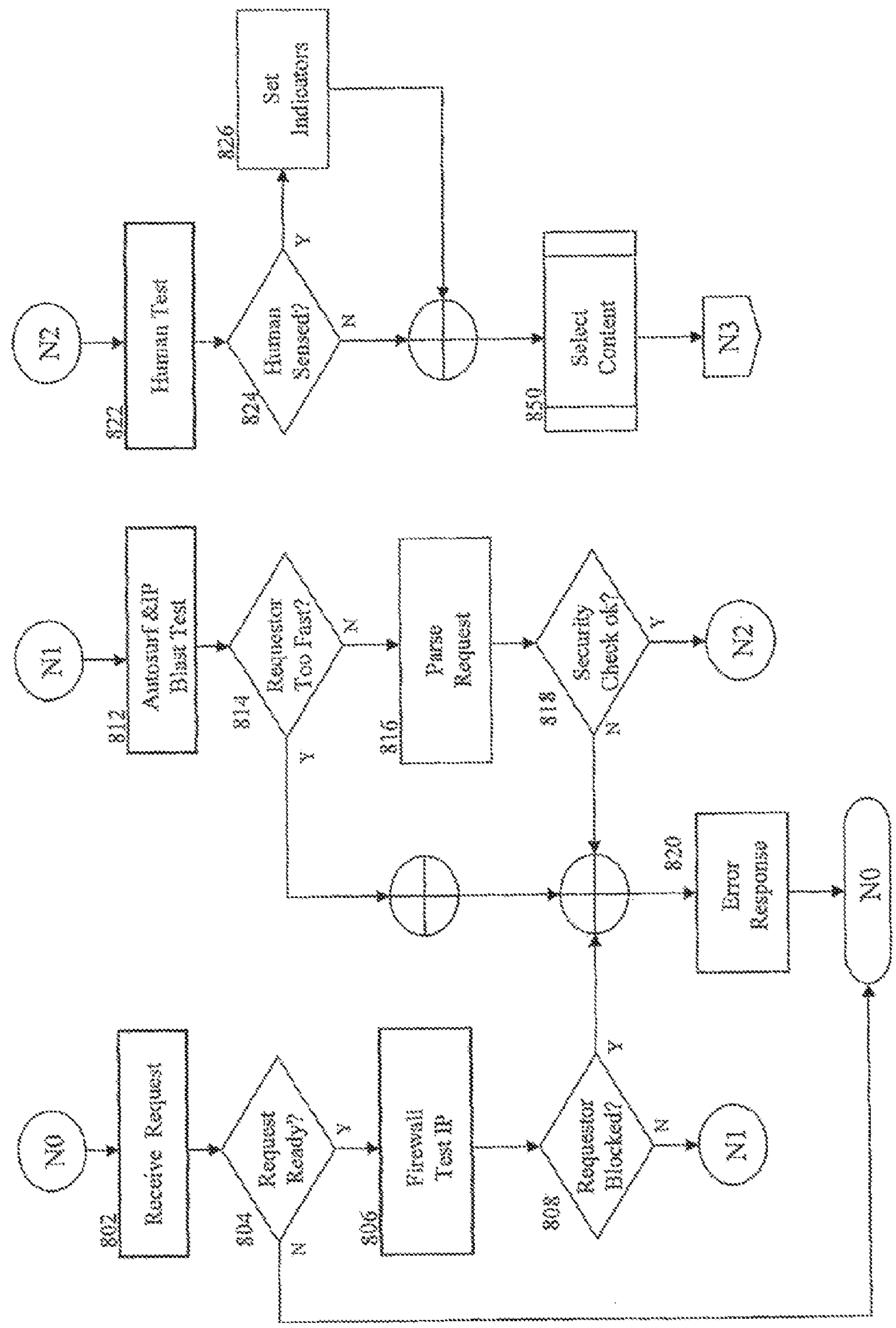
FIG. 8 is a flow chart representing first stage and key processing steps of the exchange controller's ability to organize a lookup of content while operating in a secure and indirectly human presence aware manner.

FIG. 8 is a flow chart of the exchange controller's request-response cycle of the overall content presentation system. This diagram assumes a network device has in some form transmitted a request for content to the exchange controller. The initial state of the exchange controller is depicted as an entry point or ready state (NO) in the diagram. At entry, attempted receipt of the request occurs (802), a test is made to see if a request exists (804), and if not, the cycle repeats, hi this representation, it is a polling model whereby in the traditional embodiment the exchange controller waits at state (804) for interrupt driven stimulation (request ready notification). In any event, no additional processing generally occurs until a request is present (stimulation of the exchange), and an iteration of some form among entry point (NO), the attempted inspection or receipt of a request (802), and the test for readiness of the receipt (804) occurs until a request is ready for further processing.

Upon stimulation, the exchange proceeds to process the stimulus by initiating a Firewall Test (806). The Firewall Test is a network request blocking consideration and in an embodiment uses the IP address of the requesting device and locally stored IP addresses as a basis for testing if a request should be allowed. In an embodiment, the Firewall may be enabled or disabled. If the requestor is not blocked from submitting requests to the exchange controller as answered by testing (808), the system process continues to the logical point (N1) in the process.

The exchange controller initiates a second and third test referred to as AutoSurf and IP Blast Test (812) that determine if the requestor is proceeding to repeat requests too quickly to the exchange controller. The period between requests by IP address is generally the basis for this test. However the basis for the test may be varied to eliminate the IP address or to base it upon a time period and alternate data arriving directly or indirectly as part of the request. Upon summarization of the test results determining if the requestor is too fast (814) the system will proceed to parse the request (816) or reject the request and optionally respond with an error message (820). In an embodiment sensitive to strict security, the response on error may be null as to not give the stimulating device or user any information.

This is particularly the case when the user is considered an attacker, a user who intends to do harm to the exchange system. The built-in Firewall, AutoSurf, and IP Blast logic tests are preferable features of this application, related to a content exchange controller; however each or all may be excluded or separated within alternate embodiments without impacting the frame-based content presentation methods or other aspects of the content exchange controller and this application.

The parsing of the request maybe intent upon determining the type of request, the requestor, the desired content or other targeting or biasing criteria, and in particular to the network browsing device special human sensitized features, whether the signal that a human is present or not is conveyed as part of the request. In addition, when security is enabled, a general security check (818) occurs to validate the request as from an authenticated or allowed network browsing device or other source of stimulus, such as an alternate exchange controller that has relayed a request or made an independent request. Upon passing the security test, the process moves to the next logical point in the process (N2). Upon failure, the error response process (820) occurs.

After the security test occurs, a Human Test (822) for the "human is present" criteria passed to the exchange controller (14) from a human sensitized network browsing device (10) is made. If passed by testing (824), the exchange controller sets indicators that a human is present (826) and as such may leverage those indicators in later processing. In an embodiment, this is done through server side cookies or by asserting control data to a database, both leveraged for later lookup during a content selection phase (850). It should be understood that an embodiment of the exchange controller may allow many near simultaneous and overlapping requests to be processed in parallel. The content selection phase of the exchange controller (850) is described in greater detail by the flow chart presented in FIG. 8*a*. The process continues at the entry point for content selection (N3) where a search for content meeting the criteria previously derived occurs. If the content is found at step (852), the controller continues to a Format & Respond step (854). During the Format & Respond step, the response may vary based on the criteria arriving with the request. For example, the exchange controller may respond with a frame generation set to deliver advertising or other content, a list of advertisers in its inventory either formatted or otherwise, or a fully formed web document for later rendering in a frame originated by a Metasearch Engine.

While these examples are explicit relative to an embodiment of an exchange controller, they should not be considered as limitations of the exchange controller or this application. Upon response, the exchange controller generally proceeds to adjust credits (858). To determine whether credits are adjusted or not (858), the controller may first determine whether a human is present by testing (856) for indicators previously set (FIG. 8, step 826). If set, then the exchange controller may proceed to deduct or otherwise adjust credits (858) for either or both the advertisers whose content was delivered for viewing, or adjust credits of a user for the effort or time consumed during a content or advertising presentation cycle. Upon adjustment, the exchange controller will return to a ready state (FIG. 8—entry point NO), typically waiting for the next request.

Figure 8A:
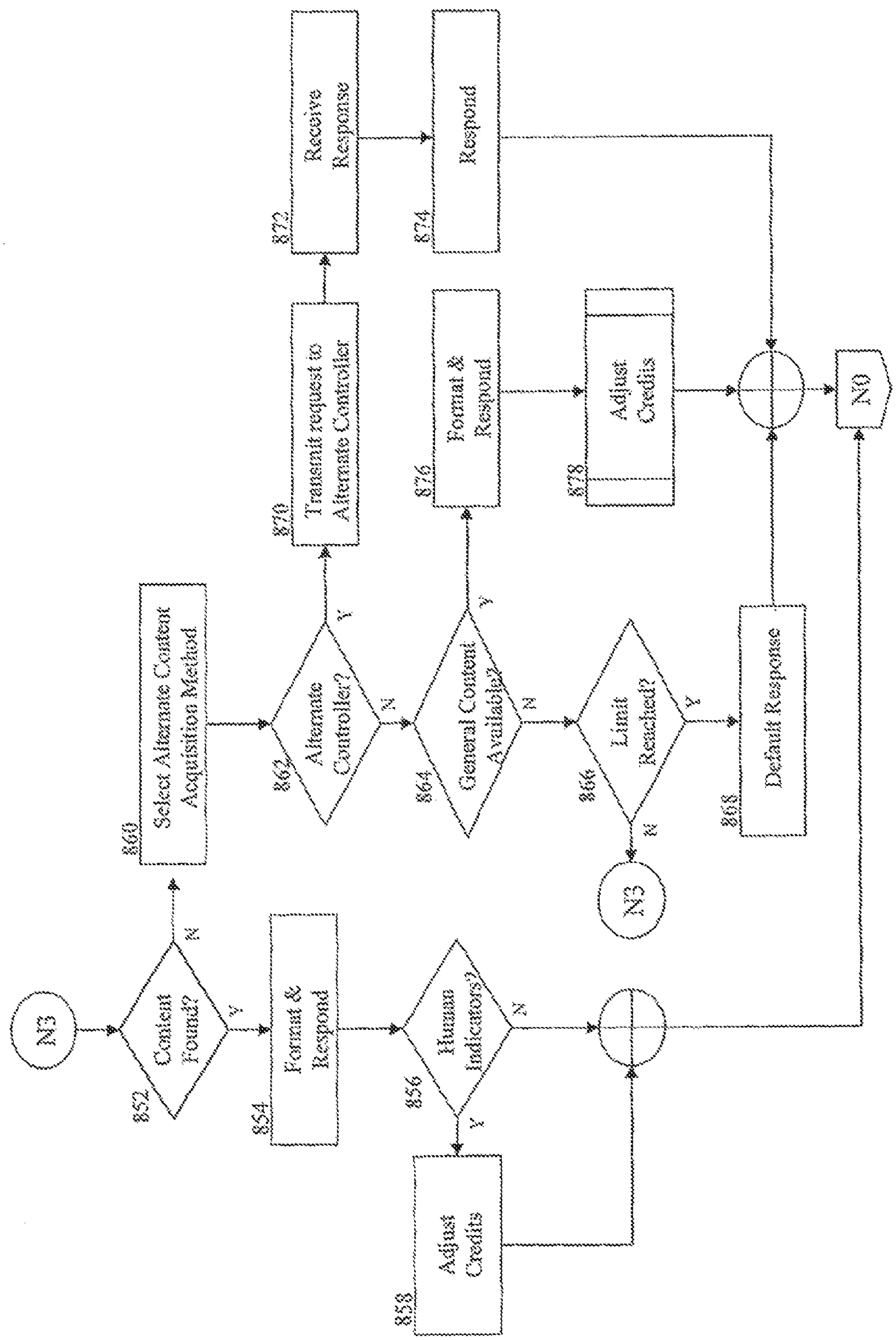
FIG. 8*a* is a flow chart of secondary stages of the network exchange controller regarding its ability to select content directly or indirectly and respond to stimulus.

As can be seen in FIG. 8*a*, the content selection process becomes more interesting when content meeting the original criteria is not directly found in the exchange controller's local inventory. When the related test (852) for local matching content fails, it may fail for a number of reasons. These reasons may include a lack of advertising credits in an advertiser's account, lack of matching content, or lack of matching content that has not been shown within certain time limits. Regardless, when content fails to meet matching criteria and passing policy based tests, the original exchange controller (14) may select an Alternate Content Acquisition Method (860) for servicing the request. The alternate methods vary but may include dispatch to an alternate exchange controller (862/870), selecting non-targeted or unrelated content (864), selecting generic content or default content (868), or responding with an error, or when heavily secured, not responding with content under extreme circumstances. If the test for an alternate controller (862) fails, the exchange controller may option to select from general content that does not necessarily match the request criteria but will suffice to service a request.

If the test for general content availability (864) passes, the exchange controller may format and respond (876) in some manner depending on the request type. Following the response, and with the exchange controller's knowledge of what advertisers' content was delivered for, the traditional process of adjusting credits (878) may occur. A reference to the traditional process of adjusting credits refers to an analogous operation that combines the test for human indicators (856) and then adjusting credits (858) accordingly. The process of adjusting credits may further involve debiting or rewarding an advertiser with credits, rewarding a human surfer with credits, or rewarding a referrer with credits. The credits noted may also be a fractional portion of a credit and vary based on request type and context of exchange controller use as is normally varied by services levied by the request type involved. The invention could easily also debit credits to penalize participants for inappropriate use of the system or services without significant change to the exchange controller.

In review, the selection for Alternate Content and the Acquisition Method (860) had the option of immediately transmitting/relaying the request to an alternate controller. If this option is accepted by the test logic (862) then the request is transmitted through a predetermined and cooperative communications process (870). This process (870) may consist of reformatting or adding to a response, and in particular adding security credentials that are optionally encrypted for consumption and test by the selected remote controller's security test (818). When the exchange controller initiates a request to a remote exchange controller, it will then wait and receive the response (872), and then respond to the original request (874). When the request is processed to this level, the exchange controller returns to ready state (FIG. 8, entry point NO) and waits for the next request, which restarts this process. It is to be noted that this process is generally repeated for content and sometimes occurs simultaneously when the exchange controller is determining content for multiple frames. Also, of interest, is the fact that the content or advertising content URLs embedded in the rendering instructions delivered as the response in the form of a frame generation set, or in some contexts a URL, by a first contacted exchange controller (14) may be partially from local advertising inventory or the remote advertising inventory of a remote controller on a per frame/per request, intermixed transparently to a network browsing (10) or other requesting device.

Figure 9:
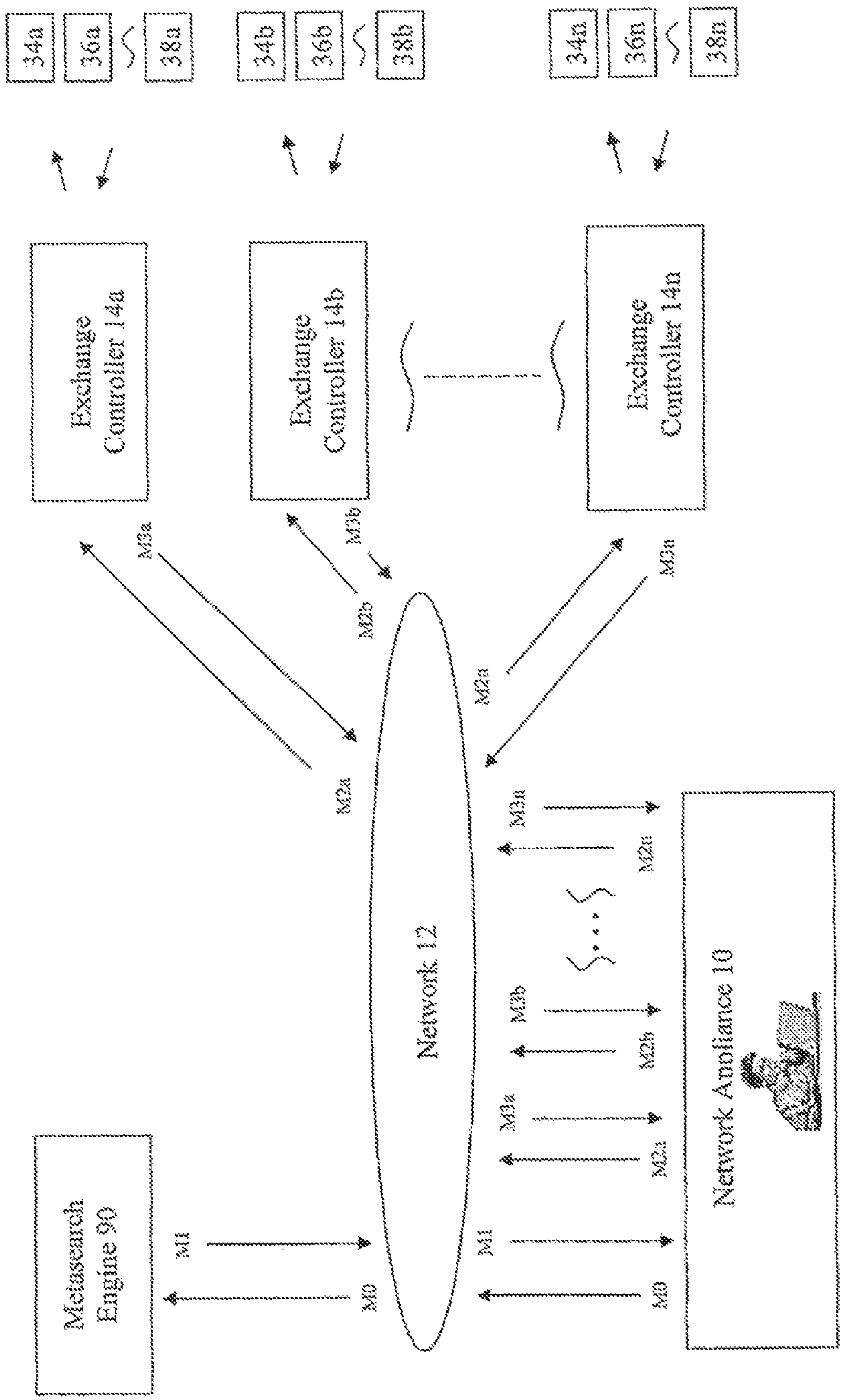
FIG. 9 is a schematic diagram of a network appliance, or equivalent browsing device, interacting with a Metasearch Engine that is leveraging one or more exchange controllers for content selection and presentation.

As stated, the exchange controller (14) varies the response content (FIG. 1, stream 1) and formatting of the response based on the requestor and criteria sent in the request. Of the response types the exchange controller is capable of responding with, these include a frame generation stream, a web document providing navigation information, formatted or unformatted advertiser inventory information (where formatted refers to as a full web document and unformatted may be an ASCII equivalent list), a URL useful for filling the SRC tag of a frame within a frameset generation stream, or a more robustly formatted web document representing inventory as can be useful in a distributed Metasearch Engine model. FIG. 9 is a schematic diagram of a MetaSearch system leveraging a website or equivalent as the provider of a starting web document for the web search process. The Metasearch Engine (90) is embodied as a web server delivering a web page rendered initially by a URL reference in the browsing device (10). The initial request for the metasearch website occurs through a normal URL reference in the network browsing device or by another URL reference. Upon receipt of the request by the server housing the Metasearch Engine (90), the server responds to the browser and the network browsing device renders the web page that may act as a search interface for the user.

This process is depicted by analogous communications (MO & M1) that initially do not contain search criteria. It should be noted that the details of the process of rendering the initial web document (interface) that allows submission of search criteria to the Metasearch Engine (90) by the browsing device are not necessary to an understanding of the concepts described herein. The presentation of the initial interface for search submission may be a website page on a server or a web document stored locally in the web browsing device, whereby no network communications occurs to develop the initial search interface, which may be a web document containing standard HTML level forms for filling and later posting to the Metasearch Engine (90).

Once the interface is presented, upon adjustment of the search criteria within the web browsing device, the user may submit/transmit that criteria (MO) to the Metasearch Engine (90) whereby the Metasearch Engine (90) selects a list of remote exchange controllers (14*a* . . . 14*n*) and formats a web document containing frames (or iframes or their equivalent), and SRC tags for each as related to the selected exchange controllers (14*a* . . . 14*n*).

The SRC URL for each frame is returned by the engine 90 and not necessarily handled or processed in any other way. This feature of the system provides the responsiveness of the exchange controller for use in searching local adverting content and other information about its advertisers' websites and their websites' content. The SRC URLs may contain arguments or attributes representing any search criteria, compensation oriented affiliate ID or member ID credentials, or security credentials for later processing by an exchange controller. Upon receipt of the web document (M1) from the Metasearch Engine (90), the normal operation (http equivalent requests) of the rendering process of the network browsing device (10) dispatches the requests to remote exchange controllers (M2*a*, M2*b*, . . . M2*n*) and waits for content to be returned and rendered by each frame. Each of the frames (or iframes) of the browsing device receive formatted web documents (M3*a*, M3*b*, . . . M3*n*) representing the content of the advertisers (34*a, b*, . . . n, 36*a, b*, . . . n, 38*a, b*, . . . n) derived from each of the exchange controllers selected by the Metasearch Engine (90). No knowledge or processing of any content occurs by the Metasearch Engine (90) and the combination and final presentation of the data received from the separate exchange controllers is managed solely within the network browsing device. As such, this MetaSearch Engine (90) is considered passive. The Metasearch Engine (90) delivers a web document consisting of a robust frame/iframe generation stream and the network browsing device completes acquisition of ultimate content for each frame by requests (M2*a*, M2*b*, . . . M2*n*) and renders the responses (M3*a*, M3*b* . . . M3*n*).

In the disclosed embodiment, the exchange controller supports an active centralized metasearch engine that can actively combine the results received from separate exchange controllers. However the active model of metasearch engine is common to the Internet, and is not novel per se. The novelty of the MetaSearch Engine (90) described herein is related to: selecting and leveraging the disjoint exchange controllers, its operation as a MetaSearch Engine (90) being effectively virtual whereby no processing of search or content is done by or within the MetaSearch Engine (90), it is effectively dataless and is wholly data optional relative to actual content, and simply forms a document containing containers and instructions for the network browsing device to actually dispatch and coordinate collection and presentation of search results implicitly. In effect, the MetaSearch Engine (90) enables a network-browsing device to become the sole stimulus to the exchange controllers and sole processor for collecting and rendering of search results, and sole presentation mechanism for users. Once the initial document containing no searched for data is delivered to the network-browsing device, the entire process of search result acquisition and rendering is completely transparent to the MetaSearch Engine (90). It should be noted that this is also completed without the need for browser-based scripting languages or cookies of any kind.

Figure 10:
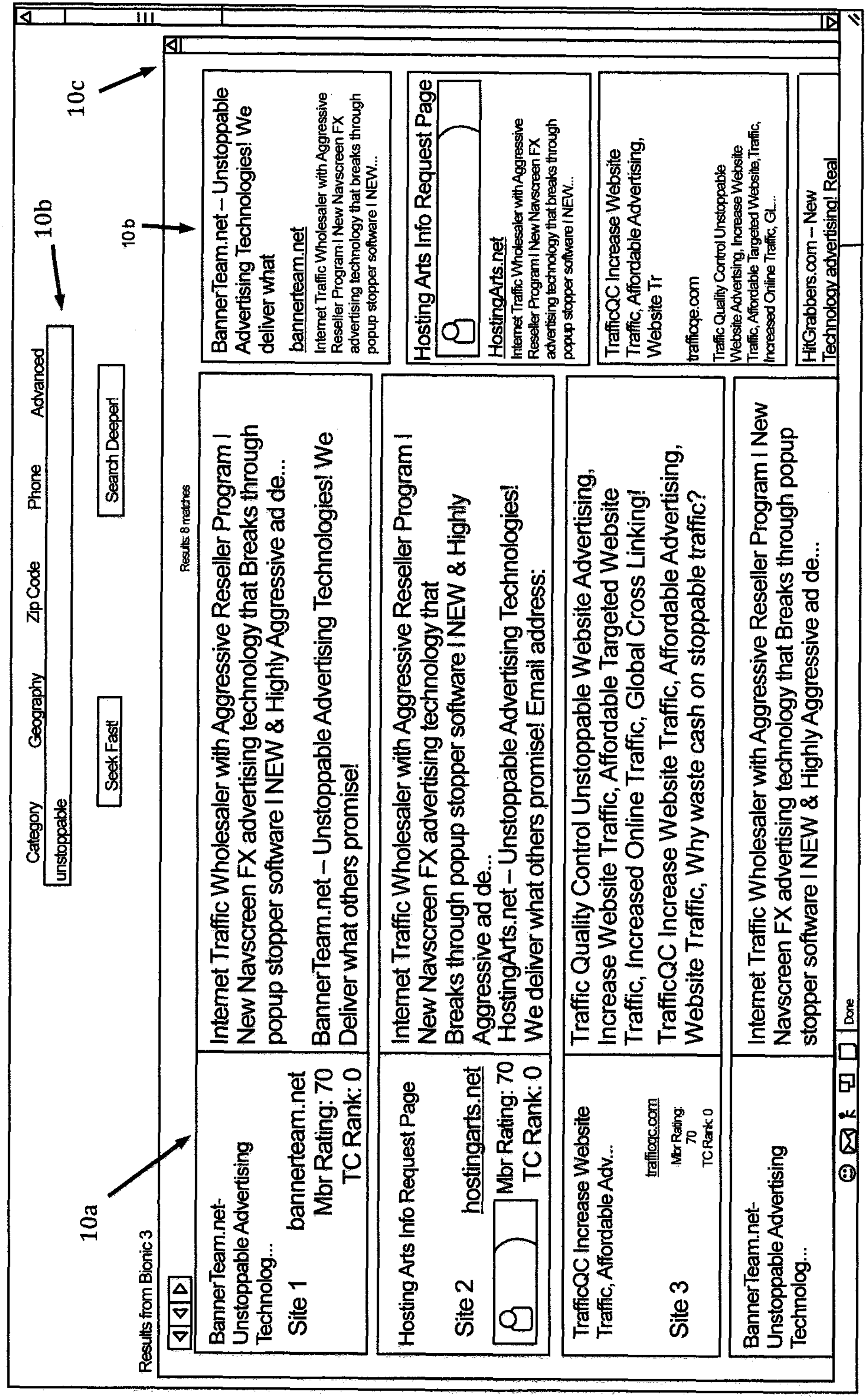
FIG. 10 is an example of the results presented in the window area of a network browsing device as constructed by the Metasearch Engine and one or more of the exchange controllers the Metasearch Engine leveraged during a search process.

The document generated by the Metasearch Engine (90) may inter-stitch other advertisements, such as banners, between the framed sections. FIG. 10 depicts an example of a resulting search encompassing one entire search, request, and rendering cycle, and notably using one type of many supported criteria, hi this example, the Metasearch Engine has selected an exchange controller operating under a name of Bionic 3, as shown, as well as other exchange controllers whose responses are not shown pictorially due to lack of browser window real estate, but may be displayed in this case by scrolling the window of the rendering device using its navigation features.

An advantage to using exchange controllers for use in a distributed Metasearch Engine (90) is that the advertising content and references to advertisers' websites is organized incrementally at each of N exchange controllers.

This organization occurs by human input (manually) and by automated means, often with human review and adjustment, in an exchange controller and advertising system of this nature. This is indirectly advantageous in developing high levels of targeting related to searches for the varied content in each of the exchange controllers. The advertiser's involvement by opting to enter, or further edit and maintain, ad content in the exchange controller, as currently implemented in the form of an advertising exchange, provides for the highest possible search result and ad content quality as compared to content injected autonomously into databases by use of Internet "spidering", or other Internet "robot" methods.

Such methods are commonly used by alternate, non-advertising exchange-based, search engine architectures. The methods used by alternate search engine architectures for building up a reference dataset to provide robust search are under scrutiny relative to permissions and privacy. The exchange controller-based implementation of a search architecture including one or more of a MetaSearch Engine (90) are not challenged by such problems, yielding other potentially significant legal and political advantages over prior art.

Another practical advantage of this metasearch system is the computing power required to gather content and to conduct robust searches globally is inherently distributed among all the exchange controller nodes, advertiser's and content provider's servers, and other components of the metasearch system. The Metasearch Engine (90) and system is a robust example of leveraging the functionality of the exchange controllers and the network browsing device's ability to develop segmented portions of real estate in a window where any number of web documents from each of N exchange controllers maybe rendered. Upon rendering, the document within each frame or iframe will contain clickable features and when clicked by a user, the browser will initiate a related http request containing the SRC URL of advertising content to be rendered within the current frame, or be rendered developing an entirely distinct new window for presentation of the advertiser's content. It should be noted that the SRC URLs may be directed at the exchange controller for accounting purposes before a dispatch occurs to the advertiser's web page content/server (34*a, b*, . . . n, 36*a, b*, . . . n, 38*a, b*, . . . n) thereby potentially tracking clicks, and allowing various credits adjustments as would be normal for an advertising exchange. This ultimate ability to derive advertising content indirectly and further adjust credits in a distributed fashion among any of N exchange controllers without the Metasearch Engine (90) being content-aware makes this a scaleable solution for global organization of the Internet. While some general information about the available exchange controllers may be maintained by a Metasearch Engine (90) for purposes of selecting exchange controllers, the effective request for content by criteria is only passed along to each of the exchange controllers indirectly through the SRC URL generated for each frame/iframe on a per-controller basis.

The Metasearch Engine (90) also may control or limit the number of exchange controllers utilized during a search cycle, and other subtle items of lesser importance to the overall system and this disclosure. Examples of such items may be, the choice of human readable language utilized, or whether content related to search results, when clicked, remains within the portion of the browsing device window originally displayed or is displayed in a new browser window of some form.

Figure 9A:
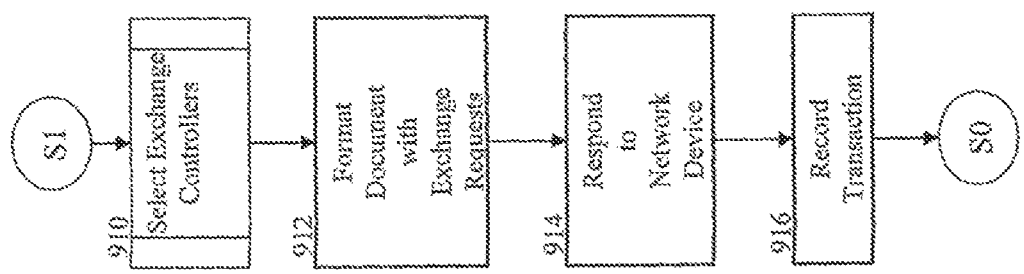
FIG. 9*a* is a flow chart of the operating process of a Metasearch Engine designed to interact with a network browsing device and form a response that indirectly dispatches search requests to networked exchange controllers.
Figure 9A:
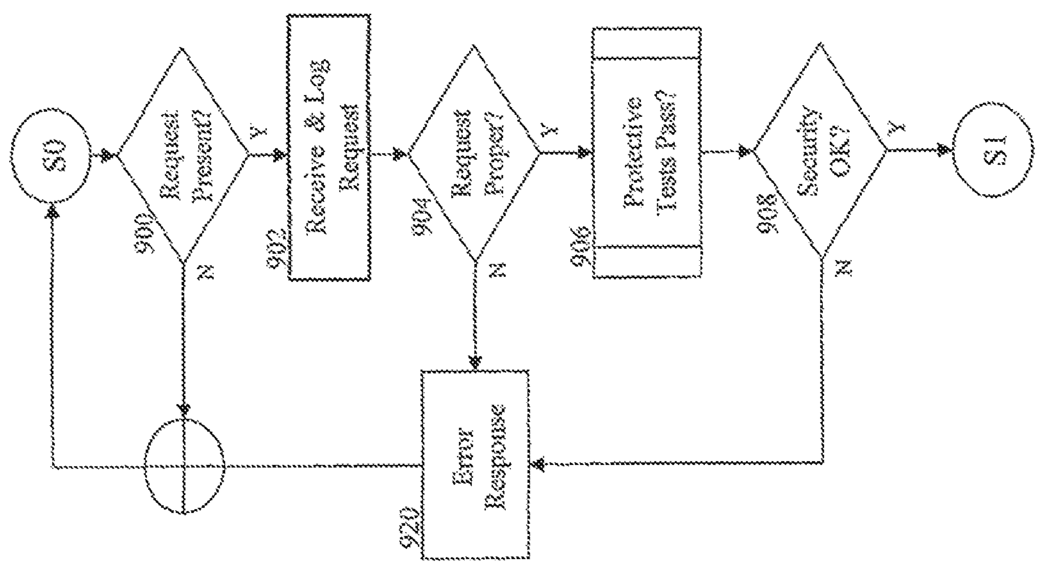

FIG. 9*a* is a flow chart of the internal process logic of the Metasearch Engine (90). Immediately following the ready state (SO), a test for a request being present (900) is made. If a request is not present, the test results in a return to ready state (SO), thereby effectively waiting for a request indefinitely. When a request is received, the test (900) results in continued processing, imitating an optional logging of the request (902), and further a test of the request (904). If failure occurs, an error message (920) is generated as a response and the system returns to ready state (SO). If the request is valid, advanced protective tests (906) of the form of Firewall, AutoSurf, and IP Blast tests, or others, previously discussed may be conducted. A test for security credentials (908) may also be conducted. If security passes, the process will proceed to the next process step (S1). If failure occurs, an error message (920) is generated as a response and the system returns to ready state (SO).

The process continues with a selection of exchange controllers (910) to derive search engine results from. In the disclosed embodiment, the exchange controllers are selected based on a variety of criteria including but not limited to: a virtual plane, the mood of the consumer, the superstition characteristics of the consumer, the personality characteristics of the consumer, indicated preferences by the consumer or a consumer's profile, the amount of time a consumer would like to retain a set of search results before allowing the search results to change even when same criteria is applied (dataset melting), the time of last use of the exchange controller, zip code, religion, organization/club, language, galaxy, planet, hemisphere, continent, country, region, district, state, county, city, town, subdivision, building or complex, address, country code, area code, keywords, words within a description, words within a meta description field, words within the content of a website or related ad content, stock symbol, SIC (Standardized Industry Code), company revenue, company size, member rating, intended audience, performance measurements of response time and reliability ratings, geographic longitude, geographic latitude, time delta from GMT, and by various category. While some of these search criteria may be non-novel or commonplace on the Internet, the novelty and uniqueness of the current invention is noted primarily by the addition of allowed criteria based on new concepts such as; the mood of the surfer, the personality of the surfer, the superstition level of the surfer, by virtual planes, and by dataset melting controls. It is also notable that pseudo-virtual criteria of galaxy and planet or the like are fully supported and also help to develop an indirect level of virtual planes for organization of the Internet in a new and novel manner.

Upon selection of the exchange controllers to leverage for this request, a web document is formed (912) consisting of frames (or iframes), and the SRC URLs of the frames set to the selected exchange controllers with appropriate criteria to conduct the remote search.

The document (FIG. 9, message M1) generated by the Metasearch Engine (90) is then communicated back (914) to the web browsing device (10) where it is rendered and alternate http requests are transmitted to the exchange controllers to conduct the search on a per-frame basis. The Metasearch Engine (90) may also record the requests, request criteria, and also record what engines were last used to ensure fair and balanced dispatch of requests among the exchange nodes in the system. Upon response (914) and recordation of the transaction (916), the Metasearch Engine (90) returns to a ready state (SO) and waits for a next request. It should be noted that the Metasearch Engine (90) may accept many and overlapping requests without negative impact.

FIG. 10 depicts output of an exchange controller in an iframe container of a centralized Metasearch website page. The notable features of this page are (10*a*) regular advertiser content ad presentation, (10*b*) featured or sponsored ad content presentation, (10*c*) optional container to capture the results from the exchange controller specific search output, and (1Od) some form of user input to adjust search criteria and initiate the search request. The system does not require the latter feature (1Od) as all criteria may be passed on the URL, or in an alternate embodiment by equivalent communications characteristics supported by an underlying networked technology such as an HTTP POST operation, and the human interface features are simply a convenience. The ads that are presented in any areas may include non-paid-for ads as filler material to present a robust search result to users and is decided by a plan file that biases how many of each ad type are presented and the layout of the presentation.

Figure 11:
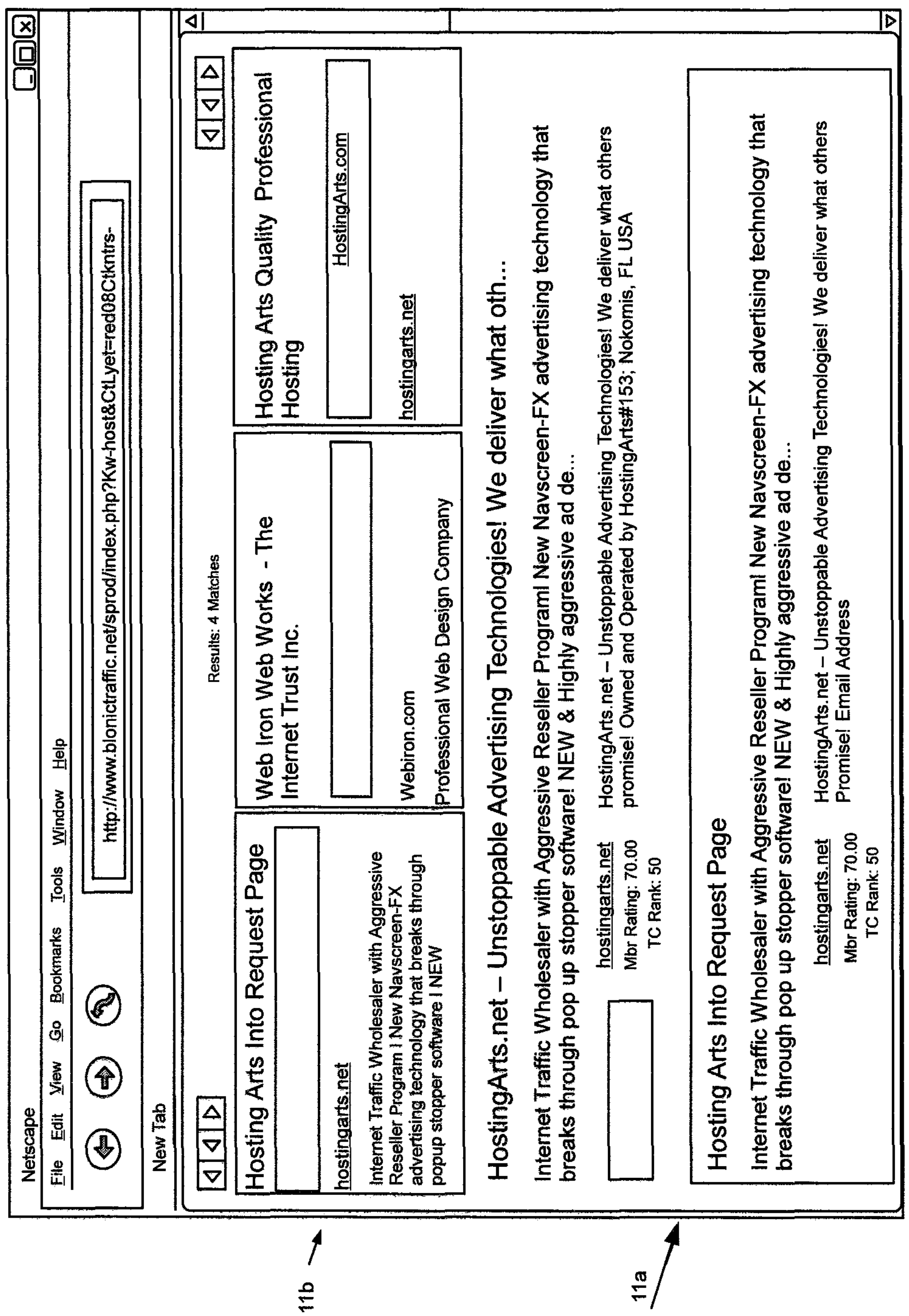
FIG. 11 is an example of an alternate layout, as compared to FIG. 10, and similar content presentation with alternate stylization as displayed in a web browser and as originally generated by an exchange controller that is an embodiment of this invention.

FIG. 11 depicts the same search engine used in FIG. 10 but controlled by a different plan file. In this example layout, (1 Ib) depicts sponsored or featured ads layed into the presentation horizontally and in a different quantity of ads, and (1 Ia) depicts regular advertisers' ads. To demonstrate the lack of need for the human optional interface, this example passes all criteria on the URL only. This capacity is useful for framing search results and content generated by disparate exchange controllers in central, local data optional, Metasearch engines for a browser device based parallelization of search processes for consumers.

An exemplary input file to a portion of the system that loads the input file as a template map, and layout control plan for determining the construction of, and presentation of, search results, for the results depicted in FIG. 10 follows:

```
# Default plan file for SE templates with vertical featured ads
rpp 8
setp 2
set 3
ser 3
serm 2
fpp 7 seftp 2
seft 2
sefr 3
body /templates/s/O/searchbody.html
header /templates/s/0/searchheader.html
footer /templates/s/O/searchfooter.html
rad /templates/s/0/searchline.html
fad /templates/s/O/feature.html
ess http://www.bionictraffic.net/templates/s/0/style.css
frnode v
radurllen 35
radtitlen 75
raddesclen 175
radcontlen 200
fadurllen 50
fadtitlen 58
faddesclen 150
fadcontlen 200
// End of plan 10
//
// Special note: Plan parts loaded by system and the css (stylesheet)
// is applied noting that the stylesheet matches the components of
// this plan (body, header, footer, rad, fad). Both ess and this plan
// file may be local to the exchange controller or remotely referenced
// transparently for use by the exchange controller.
// Lines in this control file beginning with double slashes or the
// octothorp (#) symbol are considered comments and ignored by
// the machine processing this file.
```

An exemplary input file and layout control plan for the search results illustrated in FIG. 11 follows:

```
#Alternate plan file for SE templates with horizontal featured ads rpp 4
setp 2
set 3
ser 3
serm 2
fpp 3
seftp 2
seft 2
body /templates/s/redO/searchbody.html
header /templates/s/redO/searchheader.html
footer /templates/s/redO/searchfooter.html
rad /templates/s/redO/searchline.html fad /templates/s/redO/feature.html
css http://www.bionictraffic.net/templates/s/redO/style.css
fmode h
radurllen 35
radtitlen 75
raddesclen 175
radcontlen 200
fadurllen 50
fadtitlen 58
```

-continued

```
faddesclen 150
fadcontlen 200
// End of plan 11
//
// Special note: Plan parts loaded by system and the ess (stylesheet)
// is applied noting that the stylesheet matches the components of
// this plan (body, header, footer, rad, fad). Both ess and this plan
// file may be local to the exchange controller or remotely referenced
// transparently for use by the exchange controller.
// Lines in this control file beginning with double slashes or the
// octothorp (#) symbol are considered comments and ignored by
// the machine processing this file.
```

As a significant business stimulus and motivator, the exchange controller search engine support logic is designed to allow third parties to easily override the layout and design of the search results and is a key part of the exchange controller's use as part of the overall search engine and advertising business model. The easy ability for third parties to use and customize interfaces and search systems around the exchange controller promotes interest and ultimately increases advertising volumes, therefore this powerful capability of the exchange controller to digest and combine local or distributed presentation templates and parts, including style control sheets, is important. The digester and formatter activities in the exchange controller combines the plan, the parts referenced in the plan, and the style sheet referenced in the plan or by override arguments in the URL, to dramatically vary the entire final presentation of results.

The variance may include the number of and types of ads, position and direction of ads, and colors and font sizes and other cosmetic matters specific to a user community or important to the designer of the plan, templates, and choice of incremental styles applied. The engine is a substantial abstraction and advancement over prior art relative to search criteria and rendering capabilities. This capacity effectively allows for any type of rendering device to be supported by any third party simply by changing a plan, the templates, and a style sheet that are supported by the device, and may be exercised without any change to the exchange controller logic. In practice, precautions and limits of the number of ads that a third party may request are implemented internally to prevent misuse of computing resources.

Figure 12:
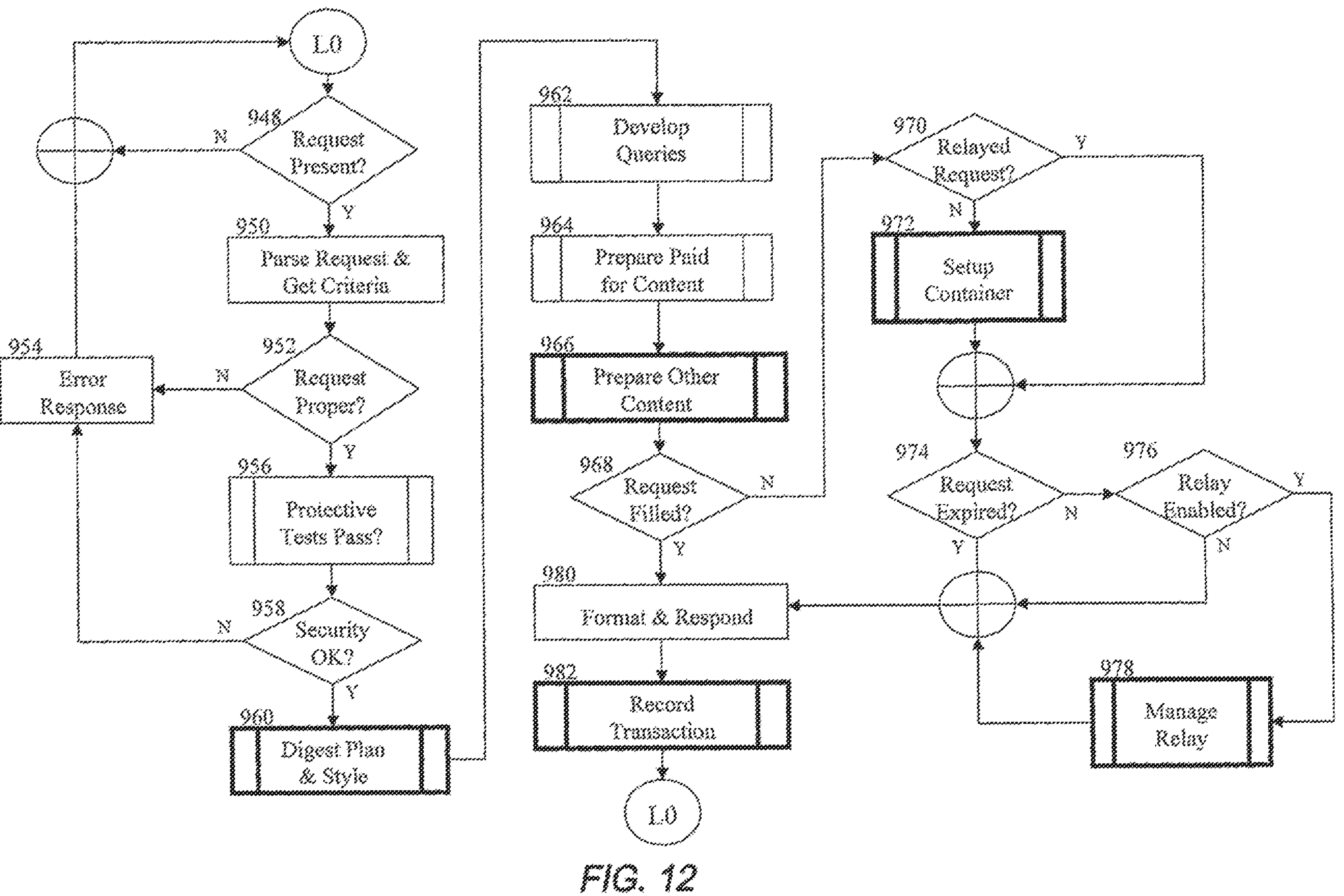
FIG. 12 is a flow chart of the asynchronous content search and flexible formatting capacity of the exchange controller embodied by this invention.

FIG. 12 is a flow chart of the logic path used by the individual exchange controllers potentially leveraged by the central Metasearch engine as demonstrated in FIG. 10, or used in a standalone mode as demonstrated in FIG. 11. Each engine is designed to be interrupt-driven by HTTP requests but as specified can be either a polling model or interrupt-driven and this aspect is unimportant. The local exchange entry point (LO) depicts the start of the overall process that is exercised at the local exchange controller, as compared to a metasearch engine that may directly or indirectly call upon this, or many other, exchange controller for search results. If a request is present (948) the process will continue to parse criteria (950) from the request and do basic syntax checking on the request (952).

Otherwise the process returns to a wait state (LO). Upon successful receipt and parsing of a valid request as tested (952), the exchange controller leverages its internal firewall and security tests (956) as described in previous literature, and if tested ok (958), proceeds to load and digest (960) the critical layout plan file, templates, and stylesheet involved (as indicated by the exemplary plan files set forth above). It should be noted that in-line style sheets may be used in the templates to replace or supplement the standalone stylesheet as well. The detail of the location of the stylized information applied to final layout and templates is implementation dependent.

The disclosed example is operating within the domain of the Internet and web-based document stylesheets. The plan file and templates referenced in the plan file, combined with the styles applied to the templates as referenced in the plan file, determines the structures and all details for laying out the search results. Part of the logic adjustments implicitly set by the plan file are variables that adjust the search queries (962) relative to type and quantity of ads needed. Generally, however optionable by the plan, paid-for advertising content is normally presented first (964) and in generally more advantageous positions in the layout results, however the layout is completely flexible regarding what ads are displayed where in the layout. That aspect is transparent to the engine, and allows the layout designer to determine that aspect. The exchange controller allows for advertisers to bid enhance their positions in the layout by increasing the number of impression credits used for each presentation, within certain time constraints.

This business model and current implementation have a reverse date order of last ad presentation round robin-like algorithm (ROOLAP algorithm) that guarantees all advertisers' ads matching any pattern or search criteria found within each exchange controller's inventory when compared to stored ad characteristics and ad meta-content, is ultimately presented. This algorithm concept is a key business advantage to the overall application of exchange controllers as a system and as compared to keyword bidded and other systems prevalent on the Internet today. The meta-content related to an ad refers to the stored searchable characteristics of the ad or its owner and a subset or modified ad content as asserted by the exchange controller or further edited by a person such as the advertiser or exchange controller administrator or their agents.

This same algorithm is also applied to non-paid-for advertising further enticing use of the search engine and advertiser capabilities, noting that non-paid-for content is presented only secondary to paid-for advertising content and customarily yet optionally in less advantageous positions in the layout in practice. To complete the business model, this same ROOLAP algorithm is applied at the Metasearch engine level for biasing the selection of exchange controllers utilized during search dispatch, thus providing a similar business and implementation guarantee to all advertisers within an overall network or within a sub-segment of a network of exchange controllers. The algorithm and business guarantee is applicable to exchange controllers, and thus advertisers, found below any one of many possible Metasearch engines that may be implemented by repetition or duplication.

When non-paid-for content is found, the exchange controller leverages the preparation of the content and causes specific URL arguments to be overridden by a referring or affiliate user, potentially an affiliate of many of the websites or ads shown in the search results, without negative impact to any remaining URL arguments. The exchange controller accepts a large set of information from a referrer and prepares for the possibility of many URLs presented in the search results to allow affiliate ID overrides. The override of URL arguments allows for third parties to refer users to the search engine or website with their own affiliate IDs so that the exchange controller engine may optionally override the URL arguments, or inter-stitch, the referrers' IDs so that the referrer may benefit financially or otherwise by any sales induced during the session by the referred user. This capacity helps referrers earn additional income while causing additional advertisements to be displayed to potential consumers and ergo increasing paid-for ad revenue for the exchange owner and sales for advertisers indirectly.

As part of the core capacities of the exchange controller architecture, the exchange controllers have the innate ability to communicate with each other and share advertising content. This capacity is further extended and supported to search criteria passing and the exchange controller's ability to digest the criteria locally and return an immediate result or relay it onto another exchange controller for remote processing and potential additional relays. This capacity helps improve search results for end users and targeting capabilities for advertisers so that their ads are displayed to the most desirable users. This relay of requests is determined if insufficient content is found locally (968) to fill the request as planned.

In the disclosed implementation, the exchange controller checks for an indicator whether the request coming into it was originally relayed (970). This is generally optional but provides a unique approach to thread search delegation to remote controllers by setting up a container (972) for the browsing device and dispatching an HTTP header redirect containing the search criteria to the container, in this case an iframe, although other containers can be used equally as well. This approach leverages current technology of modern browsing devices that support the iframe container and HTTP header redirect but is not demanded as the exchange controller can dispatch, acquire, and format the results directly, but for performance and transparency the container base approach has been chosen.

Future processor and networking speeds will approach performance where this method is insignificant, but until that date this method is efficient relative to the performance of modern technology and the Internet. As such, this approach further allows the local exchange controller to format whatever results it can from local advertising inventory and deliver the results in an expedient and dynamic manner to the end user while the browsing device triggers the next search from the inter-stitched container to an alternate exchange controller and does this in parallel with rendering of the exchange controller's local results. This improves end user perception of usability, response time, usability related to search quality, and ultimately targeting by continued search and relay for better-targeted ads and better matched content that may exist on alternate controllers.

In order to ensure that requests do not propagate forever, or an exchange accidentally is configured to send requests to itself, or a group of exchange controllers are configured to relay requests back and forth indefinitely, a counter-indicator referred to as a request hop-count is set and later adjusted at each relay or hop to the next engine and tested (974) till it reaches a predetermined limit, traditionally set to a positive number and decremented to zero, and then the transaction is no longer relayed and a default or failure response is provided. Of course, a test (976) is also made to see if the exchange controller is allowed to, and is configured to, relay requests. This process of relaying the criteria is managed (978) and as such the managing logic can dispatch and collect results, or simply format an appropriate URL with criteria and initiate the HTTP header redirect.

After content or remote requests are formed, the process continues to a formatting step (980) whereby the components of the plan, header, body, footer, and the results of the queries are combined with the remote relay containers, and a full document, generally with optional navigation features added, is transmitted to the network browsing device. Upon transmission, the exchange controller begins a process of managing a robust set of adjustments to the dataset containing ad inventory, advertiser information, end user information, and third party or affiliate information. It should be noted that these adjustments to the dataset or related credits are done specifically after transmission of the formed document to the network device to further ensure expedient response times for end users. This adjustment activity occurs as part of the recording of transactions step.

The recording of the transaction step (982) involves several incremental operations. Normal recording of network activity such as referring website information, IP address of the requests, and time or type of requests are generally logged for system and advertiser reference. Consumers and publishers are optionally credited with fractionable compensation credits for participating with the service, paid-for advertisers' credits are adjusted and consumed if their ad is presented within the guidelines allowing consumption of impression credits, and impression credit bidded ads are further adjusted based on the bid position and number of impression credits allocated to the bid. This is traditional activity. Beyond the traditional exchange controller activity, a special operation referred to as dataset "melting" or destabilization is optionally implemented. This activity effectively refreshes the search results on a per consumer basis. To understand this, a review of traditional implementations of search engines is useful for comparative purposes.

In traditional technology, data presented from search engines is highly static over short, or sometimes even long, periods of time. This is somewhat problematic for searchers who return to similar search results and still cannot find desired content because the search engine does not know the searcher has already reviewed the same search results shown, ergo frustrating users, hi a "meltable" dataset model, as implemented by this invention, the dataset and search results change after some controlled period of time. The time period is adjustable by the system administrator and end user (the searcher) in this model. This capability provides a more dynamic search result to end users, and increases advertiser rotation and ad volume for the exchange controller operators and the individual advertisers. The exchange controller provides this capability on a per-user basis as the recorded transactions and timestamps of presentation are tied to the remote IP address of the rendering device used by the end user for later reference. While another indicator such as a login profile and ID can easily be used to supplement or replace this, or some other network information discerning the individual user in the event of a technology change, the default application leverages the remote IP address to allow each user to determine how long a search result dataset is frozen (stable). The time delay in this model is referred to as the dataset melt delay time. Upon completion of the logging and dataset melt adjustments, the system returns to a normal wait state (LO) in preparation for a next request.

The exchange controller has an ability to allow advertisers with intelligent website programming to leverage human and environmental control characteristics passed to the exchange controller during stimulus events. The value of the human characteristics and environmental controls are set by the stimulus device and may be leveraged in programming to provide the advertiser website an ability to better target or present information or advertising to the surfer. The argument values passed through the exchange controller are optionally appended to the advertiser's URL during presentation of advertising. The values of the arguments are transparent to the exchange controller thus allowing support for futuristic devices unknown at time of this disclosure.

Examples of such futuristic devices may be environment controllers that change ambient lighting, temperature, sounds, or aromas for the surfer. While such devices may or may not exist at this time, the exchange controller is enabled to pass such control information along to the advertiser's website, enabling the advertiser to leverage this information to further enhance a surfer's experience. While it is understood that some information of similar nature will likely be attainable through future browser and associated web server technology, the exchange controller currently provides a flexible and generic conduit for passing such information along to the advertiser website and may be leveraged by creative advertisers until such time as similar information for enhancing a surfer's experience is available through other mechanisms.

Although embodiments have been described with reference to the presentation of advertising in a browser window on a network appliance, the principles are equally applicable to the display area of any suitable HTML or XHTML-rendering device. Further, the plan digester of the exchange controller provides a robust presentation control system that can be extended to other devices without significant change to the exchange controller logic. The presently disclosed embodiments are therefore considered in all respects to be illustrative and not restrictive.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention. Formally, the scope of the invention is indicated by the appended claims rather than the foregoing description, and all changes that come within the meaning and range and equivalents thereof are intended to be embraced therein.

The invention claimed is:

1. A method for sending secondary content via the Internet or an equivalent private network on a receptive rendering device in conjunction with requested content, comprising:

in response to a request to display said requested content, delivering a data stream to the receptive rendering device therein dividing a display area on said receptive rendering device into a plurality of data containers;

the data stream including information, which when consumed by the receptive rendering device, causes the receptive rendering device to retrieve the requested content from a content server for requested content and displaying said requested content in a first one of said data containers; and the data stream including information, which when consumed by the receptive rendering device, causes the receptive rendering device to retrieve the secondary content from secondary content server that is different than the content server for the requested content, and display said secondary content in a second one of said data containers, and causes only the secondary content to be displayed in the second one of the data containers.

2. The method of claim 1, further comprising assigning a first name to the first one of the data containers and assigning a second name to the second one of the data containers, the first name including a first randomly generated number and the second name including a second randomly generated number.

3. The method of claim 1, further comprising:

sending instructions for generating the data stream from a metasearch engine, with instructions redirecting the receptive rendering device to at least one exchange server for the requested content for the first one of the data containers and the secondary content for the second one of the data containers, which, via instructions sent by the at least one exchange server, causes the requested content to be retrieved from the requested content server and causes the secondary content to be retrieved from the secondary content server.

4. The method of claim 1, wherein said receptive rendering device is an Hypertext Markup Language (HTML), or Extensible Hypertext Markup Language (XHMTL), or Extensible Markup Language (XML) presentation descriptive language capable rendering device that has a display area and supports rendering of web documents containing language equivalent data and tags.

5. The method of claim 1, wherein said secondary content server is associated with an Internet Protocol (IP) address, which is determined, by Dynamic Name System (DNS) resolution of respective unique, symbolic, domain name on the network.

6. The method of claim 1 wherein said display area is divided into three data containers, in which said requested content is displayed in the first one of said three data containers, said secondary content is displayed in the second one of said three data containers, and a third one of said three data containers displays one or more navigation elements that enable a user to selectively display the requested content that is in the first one of the data containers and the secondary content that is in the second one of the data containers.

7. A system comprising:

a processor that is accessible via a network, and non-transitory computer memory that retains data and metadata about websites and the websites respective owner-advertisers, the non-transitory computer memory storing one or more machine instructions, which when invoked, cause the system to generate a response to a stimulus that includes a request for desired information about said web sites and the websites respective owner-advertisers;

wherein the one or more machine instructions, when implemented, cause said system to generate the response information by at least generating said response information in the form of a document, including at least data defining a plurality of data containers to be rendered within a display area of a browser of the requesting device, the plurality of data containers being visually distinct from any borders of the browsers window;

causing the requesting device to retrieve requested content from a content server for requested content and to retrieve secondary content from a secondary content server that is different than the content server for the requested content, which are accessible via the Internet; and causing the requesting device to display said secondary content within one of the plurality of data containers, the one of the plurality of data containers that displays the secondary content only displaying the secondary content.

8. The system of claim 7, comprising:

an exchange controller, which sends information redirecting the requesting device to send the requests for the requested content to the content server for the requested content and sends information redirecting the requesting device to send the request for secondary content to the secondary content server, and a metasearch engine, which sends a data stream including at least data defining the plurality of data containers to be rendered within the requesting device's display area, the metasearch engine sends instructions redirecting the requesting device to at least the exchange controller for the requested content and the secondary content.

9. The system of claim 7, the system comprising an exchange controller, wherein the exchange controller comprises a computer readable medium storing instructions for causing stimuli to be redirected via transmission to an alternate exchange controller when appropriate content based on the stimuli received is not found on the exchange controller.

10. The system of claim 7, the system comprising an exchange controller, wherein the exchange controller comprises a computer readable medium storing instructions for blocking stimuli that stimulates the system at a rate greater than a predetermined threshold.

11. The system of claim 7, the system comprising an exchange controller, wherein the exchange controller comprises a computer readable medium storing instructions for preventing a charging of, or deduction of credits of, an advertiser cites having received a request containing proper credentials.

12. The system of claim 11 whereby proper credentials are provided when a root source of stimuli is indicated to be a human being.

13. The system of claim 11, wherein said exchange controller allows fir redefinition of search result output and layout by use of digest and processing of local or remote input control files to vary the type and quantity of ads presented as well as overall cosmetic details of the presentation; and wherein said input control files and all related document templates for search response presentation data being located on any network resource domain and referenced by use of a standard URL that is digested by the exchange controller thus allowing a third party to significantly and independently reprogram and customize the end-user search interface or search results presented.

14. The system of claim 7, the system comprising an exchange controller, wherein said exchange controller contains a secondary content distribution algorithm that operates in a time based reverse order of last secondary content presented when making a selection for secondary content for next presentation and thereby ensures that all secondary content inventory are eventually displayed.

15. The system of claim 7, the system comprising an exchange controller, wherein said exchange controller has an ability to eliminate redundant simultaneous displays of duplicated affiliate websites that are associated with the secondary content, by storing a normalized base domain name, or form thereof, for each website in a separate field of a lookup table for later processing whereby a solution set for secondary content to be presented is expected to contain distinctly unique normalized base domain names and thus causes unique secondary content to be presented within an overall solution dataset.

16. The system of claim 7, farther containing instructions enabling an ability to append arguments representing end-user related human characteristics and environmental control information to the URLs of secondary content while formatting the secondary content for the purpose of allowing providers of the secondary content to enhance end-user experience.

17. The method of claim 1, wherein a region for an address of the data container only contains Uniform Resource Locators (URLs) of an exchange server;

wherein the executable code of the data stream does not contain URLs that are directly associated with the content server and the secondary content server.

18. The method of claim 6, wherein the third one of the data containers that displays the navigation includes control buttons or hypertext Links, which when selected, by the user, cause the requested content of the first one of the data containers or the secondary content of the second one of the data containers to appear in a separate window.

19. The method of claim 6, wherein the third one of the data containers that displays the navigation includes control buttons or hypertext links, which when clicked by the user, cause the requested content of the first one of the data containers and the secondary content of the second one of the data containers to replace content in an overall window of the receptive, rendering device, depending on which control button or which hypertext link is clicked.

20. The method of claim 1, farther comprising:

giving a first name to the first one of the data containers and giving a second name to the second one of the data containers, the first name including a first randomly generated number and the second name including a second randomly generated number; wherein the first name further includes a portion that is not random, wherein the second name further includes a portion that is not random.

21. A method for presenting advertising information on a device in conjunction with requested data, the method comprising the following steps:

in response to a request to display said requested data, a server having a processor and an interface to a network, sending information causing a dividing of a display area browser on said device into a plurality of regions;

retrieving, by the server, the requested data from a network resource and sending information causing the displaying on said device of said requested data in one of said plurality of regions, intended for displaying content, to form a content region; and retrieving, by the server, advertising from an advertising server and sending information causing the displaying of said advertising in another one of said plurality of regions, intended for displaying advertising, to form an advertising region; and sending, by the server, information causing the filling of yet another one of said plurality of regions, intended for navigation, with navigation tools that are displayed, on the device, to form a navigation region that is different from the advertising region and content region, by default the navigation region is displayed outside of the content region, wherein the navigation region is displayed within the display area in a manner visible to a user that enables the user to selectively display the requested data that is in said content region and the advertising that is in said advertising region in response to the user's interaction with one or more visible elements of the navigation region provided to make a selection.

22. A method for sending secondary content via the Internet or an equivalent private network on a receptive rendering device in conjunction with requested content comprising:

in response to a request to display said requested content, delivering a data stream to the receptive rendering device therein dividing a display area of a browser of said receptive rendering device into is plurality of data containers;

retrieving the requested content from a content server for requested content and displaying said requested content in a first one of said data containers; and retrieving the secondary content from is secondary content server that is different than the content server for the requested content, and displaying said secondary content in a second one of said data containers, which is dedicated to displaying only the secondary content;

wherein the requested content of the first one of the data containers and the secondary content of the second one of the data containers are by default visible simultaneously, and by default the second one of the data containers, having the advertising content, is displayed outside of the first of said data containers, having the requested content.

23. The system of claim 7, further comprising a first controller and a plurality of exchange controllers, wherein the first controller sends requests for the requested content to one of the plurality of exchange controllers, and the one of the plurality of exchange controllers further causes the requested content to be obtained from the content server for the requested content; and at least one of the plurality of exchange controllers further causes the secondary content to be obtained from the secondary content server.

24. The method of claim 1, wherein the display area of the browser on the receptive rendering device includes only one display area within which the plurality of data containers are located.

* * * * *